(12) United States Patent
Krishnan et al.

(10) Patent No.: US 12,333,763 B2
(45) Date of Patent: Jun. 17, 2025

(54) USER ASSISTANCE BASED ON COLOR RECOGNITION

(71) Applicant: Colisions, Sugar Land, TX (US)

(72) Inventors: Neha Suman Krishnan, Sugar Land, TX (US); Uday Krishnan, Sugar Land, TX (US); Monica Suman Krishnan, Sugar Land, TX (US)

(73) Assignee: Colisions, Sugar Land, TX (US)

( * ) Notice: Subject to any disclaimer, the term of this patent is extended or adjusted under 35 U.S.C. 154(b) by 381 days.

(21) Appl. No.: 17/968,029

(22) Filed: Oct. 18, 2022

(65) Prior Publication Data

US 2023/0121098 A1 Apr. 20, 2023

Related U.S. Application Data

(60) Provisional application No. 63/257,498, filed on Oct. 19, 2021.

(51) Int. Cl.
*G06T 7/90* (2017.01)
*G06F 3/0484* (2022.01)
*G06V 20/50* (2022.01)
*G06V 20/68* (2022.01)
*H04N 23/60* (2023.01)

(52) U.S. Cl.
CPC ............ *G06T 7/90* (2017.01); *G06F 3/0484* (2013.01); *G06V 20/50* (2022.01); *G06V 20/68* (2022.01); *H04N 23/60* (2023.01); *G06T 2207/10024* (2013.01)

(58) Field of Classification Search
CPC ............ G06T 7/90; G06T 2207/10024; G06F 3/0484; G06F 3/04886; G06F 3/04842; G06V 20/50; G06V 20/68; G06V 10/56; H04N 23/60
USPC .......................................................... 382/103
See application file for complete search history.

(56) References Cited

U.S. PATENT DOCUMENTS

| | | | |
|---|---|---|---|
| 2015/0283585 A1* | 10/2015 | Gual Pasalodos | G01N 21/8806 198/339.1 |
| 2016/0171534 A1* | 6/2016 | Linden | G06Q 30/0255 705/14.53 |
| 2018/0012009 A1* | 1/2018 | Furman | G06F 3/015 |
| 2020/0320607 A1* | 10/2020 | Beauchamp | G06Q 30/0627 |
| 2021/0217144 A1* | 7/2021 | Snellgrove | G06T 11/001 |
| 2022/0092825 A1* | 3/2022 | Lorry | G06F 3/0488 |
| 2022/0400945 A1* | 12/2022 | Thomason | A61B 3/032 |

\* cited by examiner

*Primary Examiner* — Ali Bayat
(74) *Attorney, Agent, or Firm* — Smith & Woldesenbet Law Group, PLLC

(57) ABSTRACT

A user device can include a controller that is configured to: receive an instruction associated with a color of an object in a volume of space; receive an image comprising the object; identify a color of the object captured in the image; generate a profile based on the object and the color; perform an analysis of the color in a manner consistent with the profile and the instruction; and present results of the analysis.

20 Claims, 7 Drawing Sheets

USER ASSISTANCE BASED ON COLOR RECOGNITION

CROSS-REFERENCE TO RELATED APPLICATIONS

This application claims priority under 35 U.S.C. § 119 to U.S. Provisional Patent Application Ser. No. 63/257,498 titled "Color Identifying application developed with AI/ML. The intent is to assist either individuals with color blindness, issues with color identification, documents with color (i.e., colored charts), medical, food, or assistance with dressing." and filed on Oct. 19, 2021, the entire contents of which are hereby incorporated herein by reference.

TECHNICAL FIELD

The present disclosure relates generally to user assistance, and more particularly to systems, methods, and devices for user assistance based on color recognition.

BACKGROUND

Some people have varying degrees of color blindness. This condition prevents a person from recognizing one or more colors. Having color blindness can lead to a number of issues for the person with that condition. Such issues can include, but are not limited to, selecting clothes that match, recognizing spoiling food, and enjoyment of visual entertainment. In order to avoid these issues, people with color blindness need some form of assistance.

SUMMARY

In general, in one aspect, the disclosure relates to a user device that includes a controller configured to receive an instruction associated with a color of an object in a volume of space, and receive an image comprising the object. The controller of the user device can also be configured to identify a color of the object captured in the image, and generate a profile based on the object and the color. The controller of the user device can also be configured to perform an analysis of the color in a manner consistent with the profile and the instruction, and present results of the analysis.

In another aspect, the disclosure can generally relate to a method for user assistance based on color recognition. The method can include receiving, by a controller of a user device via a user interface, an instruction associated with a color of an object in a volume of space. The method can also include receiving, by the controller, an image of the object from an image capturing device. The method can further include identifying, by the controller, the color of the object captured in the image. The method can also include generating, by the controller, a profile based on the object and the color. The method can further include performing an analysis, by the controller, of the color in a manner consistent with the profile and the instruction. The method can also include presenting, by the controller using the user interface, results of the analysis.

These and other aspects, objects, features, and embodiments will be apparent from the following description and the appended claims.

BRIEF DESCRIPTION OF THE DRAWINGS

The drawings illustrate only example embodiments and are therefore not to be considered limiting in scope, as the example embodiments may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles. In the drawings, reference numerals designate like or corresponding, but not necessarily identical, elements.

DETAILED DESCRIPTION

Figure 1:
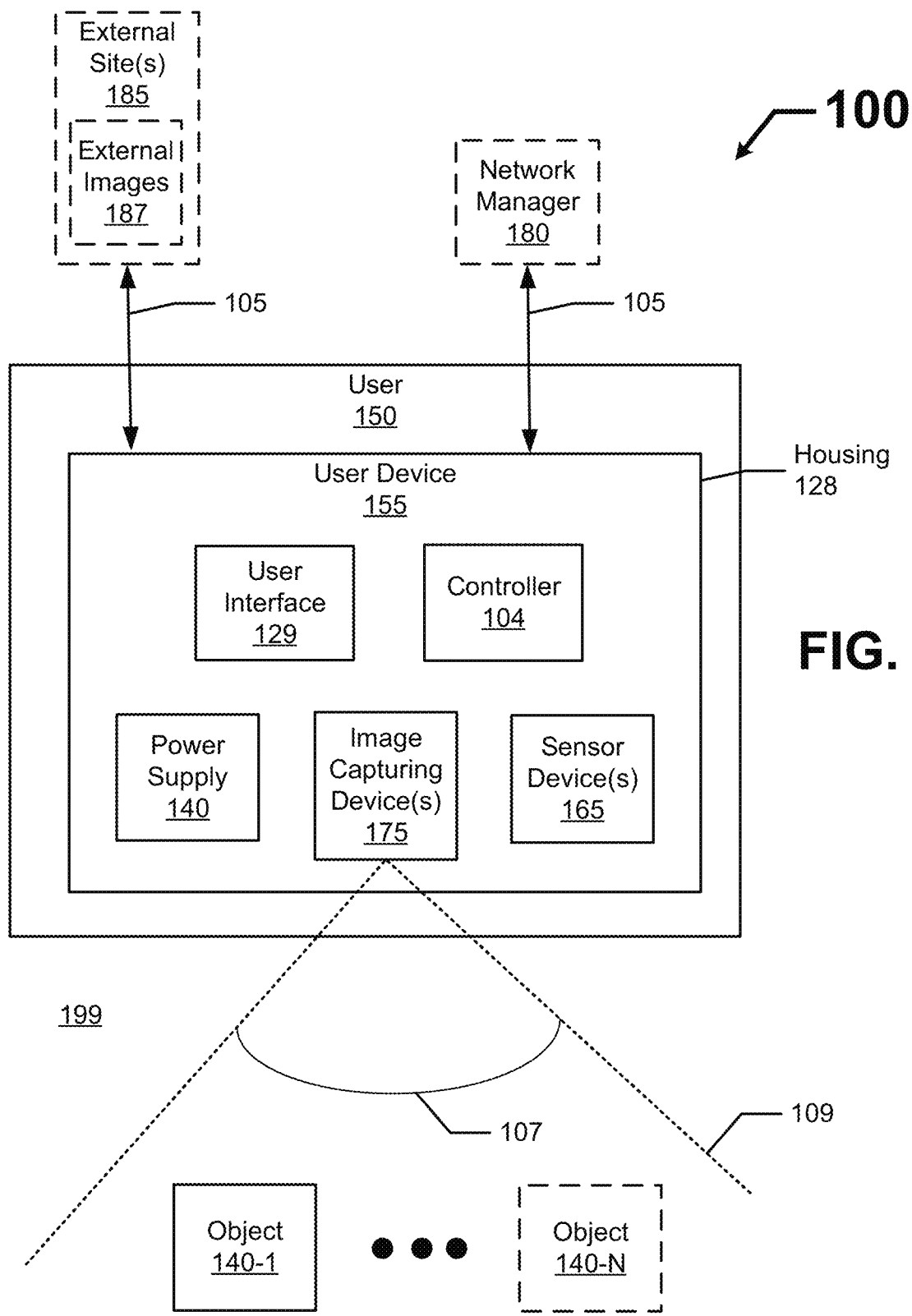
FIG. 1 shows a diagram of a system for providing assistance based on color recognition in accordance with certain example embodiments.

The example embodiments discussed herein are directed to systems, methods, and devices for user assistance based on color recognition. Example embodiments can be used by people who suffer from some degree of color blindness (e.g., protanopia, deuteranopia, tritanopia, monochromacy). Estimates are that approximately 1 in every 12 men and 1 in every 300 women in the United States have some amount of color blindness, and that about 300 million people worldwide suffer from color blindness. Alternatively, example embodiments can be used by people who have normal vision but who lack knowledge of certain information (e.g., modern fashion trends, food safety). As yet another alternative, example embodiments can be used by people who are otherwise visually impaired (e.g., full or partially blindness). Estimates are that approximately 12 million people in the United States and 2.2 billion people worldwide are visually impaired.

Example embodiments can be used in any of a number of situations. For example, example embodiments can be used to help a person (defined as a user herein) select a color-coordinated outfit from the user's closet. As another example, example embodiments can be used to help a user select one or more accessories (e.g., earrings, necklace, scarf, shoes) to go with an outfit or article of clothing. As yet another example, example embodiments can be used to help a user determine if a food item has mold.

In certain example embodiments, commissioning and operation of electrical devices in a volume of space are subject to meeting certain standards and/or requirements. Examples of agencies and other entities that can set applicable standards and/or regulations can include, but are not limited to, the National Eye Institute (NEI), the Occupational Safety and Health Administration (OSHA), Underwriters Laboratories (UL), the Federal Communication Commission (FCC), and the Institute of Electrical and Electronics Engineers (IEEE). Use of example embodiments described herein meet (and/or allow a corresponding device to meet) such standards when required.

If a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure. The numbering scheme for the various components in the figures herein is such that each component is a three digit number or a four digit number, and corresponding components in other figures have the identical last two digits.

Further, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

Example embodiments of user assistance based on color recognition will be described more fully hereinafter with reference to the accompanying drawings, in which example embodiments of user assistance based on color recognition are shown. User assistance based on color recognition may, however, be embodied in many different forms and should not be construed as limited to the example embodiments set forth herein. Rather, these example embodiments are provided so that this disclosure will be thorough and complete, and will fully convey the scope of user assistance based on color recognition to those of ordinary skill in the art. Like, but not necessarily the same, elements (also sometimes called components) in the various figures are denoted by like reference numerals for consistency.

Terms such as "first", "second", "primary," "secondary," "above", "below", "inner", "outer", "distal", "proximal", "end", "top", "bottom", "upper", "lower", "side", "left", "right", "front", "rear", and "within", when present, are used merely to distinguish one component (or part of a component or state of a component) from another. Such terms are not meant to denote a preference or a particular orientation, and such terms are not meant to limit embodiments of user assistance based on color recognition. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Figure 2:
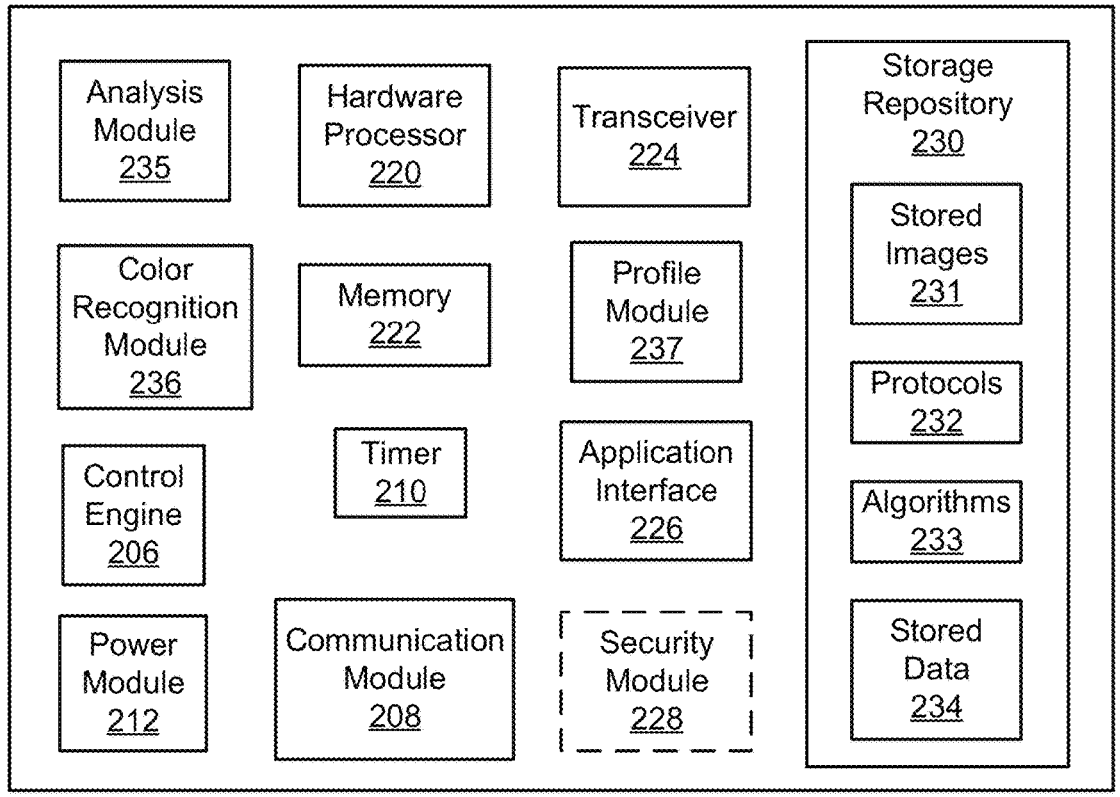
FIG. 2 shows a diagram of the controller of the user system of FIG. 1.

FIG. 1 shows a diagram of a system 100 for providing assistance based on color recognition in accordance with certain example embodiments. FIG. 2 shows a diagram of the controller 104 of the user system 155 of FIG. 1. Referring to FIGS. 1 and 2, the system 100 includes a user 150 with a user device 155, an optional network manager 180, one or more optional external sites 185, and one or more objects 140 located in a volume of space 199. The user device 155 (also sometimes called a user system 155 herein) can include multiple components. For example, in this case, the user system 155 includes a controller 104, a user interface 129, one or more sensor devices 165, one or more image capturing devices 175, and a power supply 140.

The controller 104 of the user device 155 can include any of a number of components. For example, as shown in FIG. 2, the controller 104 can include a control engine 206, an analysis module 235, a color recognition module 236, a profile module 237, a communication module 208, a timer 210, a power module 212, a storage repository 230, a hardware processor 220, a memory 222, a transceiver 224, an application interface 226, and, optionally, a security module 228. The storage repository 230 of the controller 104 can be organized by multiple categories. For example, in this case, the storage repository 230 includes stored images 231, protocols 232, algorithms 233, and stored data 234.

The user 150, the user device 155, and the objects 140 are located in a volume of space 199. The volume of space 199 can be any indoor and/or outdoor area in which the one or more objects 140 are located. A volume of space can be a single room or multiple rooms in a structure (e.g., a house, an apartment). Examples of a volume of space 199 can include, but are not limited to, a closet, a grocery store, a flea market, a department store, a clothing store, a shoe store, a bedroom, a living room, a family room, a home decoration store, and a furniture store. In some cases, the volume of space 199 can include multiple rooms in a building (e.g., a house, a store, an apartment).

The components shown in FIGS. 1 and 2 are not exhaustive, and in some embodiments, one or more of the components shown in FIGS. 1 and 2 may not be included in the system 100 or portions thereof (e.g., the user device 155). For example, any component of the user device 155 can be discrete or combined with one or more other components of the user device 155. For instance, at least part of the storage repository 130 can be located externally (e.g., in the cloud) from the housing 128 of the user device 155. As another example, the user device 155 can include one or more additional components (e.g., an antenna, a switch) that are not shown in FIG. 2. As still another example, one or more of the sensor devices 165 can be located external to the housing 128 of the user device 155.

An object 140 can be anything that has one or more colors. The system 100 can include one or more objects 140 located in the volume of space 199. For example, in this case, there are N objects 140 (object 140-1 through object 140-N). Examples of an object 140 can include, but are not limited to, an article of clothing (e.g., a shirt, a pair of pants, a pair of shorts, a jacket), a piece of jewelry, a piece of perishable food (e.g., a banana, lettuce), a piece of furniture (e.g., a chair, a sofa, a dresser), a vase, a purse, a scarf, a pair of shoes, bedding, artwork, a rug, a wall, a door, a brick, a light fixture, a flower, a greeting card, and a plant. An object 140 can be inanimate or animated (e.g., electrically-powered). An object 140 can be rigid, flexible, compressible, foldable, and/or have other structural characteristics. An object 140 can have any shape, size, color(s), and/o]r other characteristics. When there are multiple objects 140 in the volume of space 199, an object 140 can be separate from the other objects 140 or co-mingled with one or more of the other objects 140.

A user 150 may be any person that interacts with one or more of the objects 140, the user device 155, the optional network manager 180, the one or more optional external sites 185, and/or another component of the system 100. In some cases, the user 150 has an impaired ability or an inability to identify or distinguish one or more colors. In other cases, the user 150 is acting on behalf of another who has an impaired ability or an inability to identify or distinguish one or more colors. In yet other cases, the user 150 is or knows someone who lacks knowledge of certain information (e.g., modern fashion trends, food safety). Examples of a user 150 can include, but are not limited to, a legally blind person, a color blind person, a homeowner, an apartment renter, an employee, a customer, a parent, a sibling, a son, a daughter, a grandchild, a caretaker, a consultant, a contractor, and a manufacturer's representative.

In certain example embodiments, the user 150 uses the user device 155, which may include a display (e.g., a GUI). The user device 155 can be any device that has the software and hardware sufficient to allow the user 150 to enable and use example embodiments. Examples of a user device 155 can include, but are not limited to, an android device (or equivalent), a tablet, smartphones, a laptop computer, a desktop computer, a handheld device, and a personal digital assistant (PDA). The user device 155 (or portions thereof) can be portable or stationary.

The user 150 (including the associated user device 155) interacts with (e.g., sends data to, receives data from) the optional network manager 180 and/or the optional external sites 185 via the application interface 226 (described below). Interaction (including transmission of radio frequency (RF) signals and/or other types of communication signals) between the user 150 (including the associated user device 155), the network manager 180, and the external sites 185 can be facilitated using communication links 105. Similarly, communication and/or other interaction between components (e.g., between the controller 104 and a sensor device 165, between the controller 104 and an image capturing device 175) of the user device 155 can be facilitated using communication links 105.

Each communication link 105 can include one or more wired (e.g., Class 1 electrical cables, Class 2 electrical cables, Power Line Carrier, RS485, DALI, electrical connectors) and/or wireless (e.g., Wi-Fi, visible light communication, cellular networking, Bluetooth, BLE, Zigbee, LoRa, ultra-wideband (UWB), WirelessHART, ISA100) technology. For example, a communication link 105 can be (or include) one or more electrical conductors that are coupled to various components of the system 100. The communication links 105 can transmit signals (e.g., power signals, communication signals (e.g., RF signals), control signals, data) between the external sites 185, the user 150 (including the associated user device 155 and portions thereof, such as the sensor devices 165), and/or the network manager 180. For example, the user device 155 can broadcast communication signals to some of the external sites 185 of the system 100 at a given time and from a given location within the volume of space 199 using BLE over the communication links 105.

The optional network manager 180 is a device or component that controls all or a portion of the system 100. The network manager 180 can be substantially similar to the controller 104 of the user device 155. Alternatively, the network manager 180 can include one or more of a number of features in addition to, or altered from, the features of the controller 104 of the user device 155. There can be more than one network manager 180 and/or one or more portions of a network manager 180.

In some cases, a network manager 180 can be called by other names, including but not limited to an insight manager, a master controller, a network coordinator, and a network controller. In the embodiment shown in FIG. 1, the network manager 180 receives data from the user device 155 and processes this data (e.g., using algorithms (e.g., algorithms 233) and/or protocols (e.g., protocols 232)) to identify one or more colors, suggest matching of certain objects 140 based on color, identify a condition of an object 140 based on color, and/or otherwise assist the controller 104 of the user device 155. The network manager 180 can be located in the volume of space 199 or remotely from the volume of space 199.

Each optional external site 185 of the system 100 is or includes a website and/or other digital repository of information and/or external images 187 that include one or more objects. Such objects captured in the external images 187 can be similar to, can complement, and/or can be unrelated to the objects 140 in the volume of space 199. An external site 185 can be used to provide additional information (e.g., identification information, fashion trends, health information) to the controller 104 of the user device 155. In addition, or in the alternative, an external site 185 can offer products that can be used as references and/or suggestions by the controller 104 of the user device 155. An external image 187 of an external site 185 can be copied and saved by the user device 155 as a stored image 231.

The controller 104 of the user device 155 can send RF signals and/or other types of communication signals to and/or receive RF signals and/or other types of communication signals from the one or more external sites 185 and/or the network manager 180 in the system 100. The controller 104 of the user device 155 can use one or more of a number of communication protocols (e.g., part of the protocols 232) in sending communication signals to and/or receiving communication signals from the one or more external sites 185 and/or the network manager 180.

The network manager 180, one or more sensor devices 165, the one or more image capturing devices 175, and/or the one or more external sites 185 can interact with the controller 104 of the user device 155 using the application interface 226 in accordance with one or more example embodiments. Specifically, the application interface 226 of the controller 104 receives data (e.g., information, communications, instructions) from and sends data (e.g., information, communications, instructions) to the network manager 180, the one or more sensor devices 165, the one or more image capturing devices 175, and/or the one or more external sites 185. The network manager 180, the sensor devices 165, the one or more image capturing devices 175, and/or the one or more external sites 185 can include an interface to receive data from and send data to the controller 104 in certain example embodiments. Examples of such an interface can include, but are not limited to, a graphical user interface, a touchscreen, an application programming interface, a keyboard, a monitor, a mouse, a web service, a data protocol adapter, some other hardware and/or software, or any suitable combination thereof.

The controller 104 of the user device 155, the network manager 180, the one or more sensor devices 165, the one or more image capturing devices 175, and/or the one or more external sites 185 can use their own system or share a system in certain example embodiments. Such a system can be, or contain a form of, an Internet-based or an intranet-based computer system that is capable of communicating with various software. A computer system includes any type of computing device and/or communication device, including but not limited to the controller 104. Examples of such a system can include, but are not limited to, a desktop computer with a Local Area Network (LAN), a Wide Area Network (WAN), Internet or intranet access, a laptop computer with LAN, WAN, Internet or intranet access, a smart phone, a server, a server farm, an android device (or equivalent), a tablet, smartphones, and a personal digital assistant (PDA). Such a system can correspond to a computer system as described below with regard to FIG. 3.

Further, as discussed above, such a system can have corresponding software (e.g., user software, controller software, network manager software). The software can execute on the same or a separate device (e.g., a server, mainframe, desktop personal computer (PC), laptop, PDA, television, cable box, satellite box, kiosk, telephone, mobile phone, or other computing devices) and can be coupled by the communication network (e.g., Internet, Intranet, Extranet, LAN, WAN, or other network communication methods) and/or communication channels, with wire and/or wireless segments according to some example embodiments. The software of one system can be a part of, or operate separately but in conjunction with, the software of another system within the system 100.

The user device 155 can include a housing 128. The housing 128 of the user device 155 can include at least one wall that forms a cavity. In some cases, the housing 128 can be designed to comply with any applicable standards so that the user device 155 can be located in a particular environment (e.g., a hazardous environment). The housing 128 of the user device 155 can be used to house one or more components of the user device 155, including one or more components of the controller 104. For example, the controller 104 (which in this case includes the control engine 206, the analysis module 235, the color recognition module 236, the profile module 237, the communication module 208, the timer 210, the power module 212, the storage repository 230, the hardware processor 220, the memory 222, the transceiver 224, the application interface 226, and the optional security module 228), the one or more sensor devices 165, the one or more image capturing devices 175, the user interface 129, and the power supply 140 can be disposed, at least in part, in the cavity formed by the housing 128. In alternative embodiments, any one or more of these or other components of the user device 155 can be disposed on the housing 128, integrated with the housing 128, and/or disposed remotely from the housing 128.

The storage repository 230 of the controller 104 can be a persistent storage device (or set of devices) that stores software and data used to assist the controller 104 in communicating with a user 150, the network manager 180, the sensor devices 165, the one or more image capturing devices 175, and the one or more external sites 185 within the system 100. In one or more example embodiments, the storage repository 230 stores stored images 231, one or more protocols 232, one or more algorithms 233, and stored data 234.

The stored images 231 includes previously captured images. Some or all of these previously captured images can be of one or more objects 140 in the volume of space 199. A stored image 231 can be organized by time that the stored image was captured, objects 140 captured in the stored image 231, location of the image (e.g., within the volume of space 199, a captured in the stored image 231, some other factor, or any suitable combination thereof. In some cases, one or more of the stored images 231 can be from or of an object from an external site 185.

The protocols 232 can be any procedures (e.g., a series of method steps) and/or other similar operational procedures that the control engine 206 of the controller 104 follows based on certain conditions at a point in time. A protocol 232 can include a process for identifying colors of an object 140. In addition, or in the alternative, a protocol 232 can include a process for matching one object 140 with another object 140 based on color. Protocols 232 can be evaluated (e.g., using past data, using current data) and adjusted from time to time by the control engine 206 so that such protocols 232 can be more accurate and reliable in the future.

The protocols 232 can further include any of a number of communication protocols that are used to send and/or receive data between the controller 104 and the user device 155, the network manager 180, the sensor devices 165, the one or more image capturing devices 175, and/or the one or more external sites 185. One or more of the protocols 232 used for communication can be a time-synchronized protocol. Examples of such time-synchronized protocols can include, but are not limited to, a highway addressable remote transducer (HART) protocol, a wirelessHART protocol, and an International Society of Automation (ISA) 100 protocol. In this way, one or more of the protocols 232 used for communication can provide a layer of security to the data transferred within the system 100.

The algorithms 233 can be any formulas, mathematical models, forecasts, simulations, and/or other similar tools that the control engine 206 of the controller 104 uses to reach a computational conclusion. As an example, one or more algorithms 233 can be used to calculate the cost of obtaining additional objects 140. As another example, one or more algorithms 233 can be used to identify one or more colors of an object 140. Algorithms 233 can be used to analyze past data, analyze current data, and/or perform forecasts. Algorithms 233 can be evaluated (e.g., using past data, using current data) and adjusted from time to time by the control engine 206 so that such algorithms 233 can be more accurate and reliable in the future. One or more particular algorithms 233 can be used in conjunction with one or more particular protocols 232. For example, one or more protocols 232 and one or more algorithms 233 can be used in conjunction with each other to identify and budget for the purchase of an additional object through an external site 185.

Stored data 234 can be any data associated with the objects 140, any data associated with the user device 155, any data associated with the image capturing devices 185, any data associated with the network manager 180, any measurements taken by the sensor devices 165, threshold values, user preferences, results of previously run or calculated algorithms 233, and/or any other suitable data. Such stored data 234 can be any type of data, including historical data, present data, and forecasts. The stored data 234 can be associated with some measurement of time derived, for example, from the timer 210.

Examples of a storage repository 230 can include, but are not limited to, a database (or a number of databases), a file system, a hard drive, flash memory, cloud-based storage, some other form of solid state data storage, or any suitable combination thereof. The storage repository 230 can be located on multiple physical machines, each storing all or a portion of the stored images 231, the protocols 232, the algorithms 233, and/or the stored data 234 according to some example embodiments. Each storage unit or device can be physically located in the same or in a different geographic location.

The storage repository 230 can be operatively connected to the control engine 206. In one or more example embodiments, the control engine 206 includes functionality to communicate with the network manager 180, the sensor devices 165, the one or more image capturing devices 175, and the one or more external sites 185 in the system 100. More specifically, the control engine 206 sends information to and/or receives information from the storage repository 230 in order to communicate with the network manager 180, the sensor devices 165, the one or more image capturing devices 175, and the one or more external sites 185. As discussed below, the storage repository 230 can also be operatively connected to the communication module 208 in certain example embodiments.

In certain example embodiments, the control engine 206 of the controller 104 controls the operation of one or more other components (e.g., the analysis module 235, the color recognition module 236, the profile module 237, the communication module 208, the timer 210, the transceiver 224) of the controller 104. For example, the control engine 206 can put the communication module 208 in "sleep" mode when there are no communications between the controller 104 and another component (e.g., the network manager 180, an external site 185) in the system 100 or when communications between the controller 104 and another component in the system 100 follow a regular pattern. In such a case, power consumed by the controller 104 is conserved by only enabling the communication module 208 when the communication module 208 is needed.

As another example, the control engine 206 can direct the timer 210 when to provide a current time, to begin tracking a time period, and/or perform another function within the capability of the timer 210. As yet another example, the control engine 206 can direct the transceiver 224 to send RF signals (or other types of communication signals) and/or stop sending RF signals (or other types of communication signals) to the network manager 180, one or more sensor devices 165, one or more of the image capturing devices 175, and/or one or more of the external sites 185 in the system 100.

The control engine 206 of the controller 104 can use one or more protocols 232 and/or one or more algorithms 233 to identify one or more objects 140 captured in an image by an image capturing device 175. The control engine 206 of the controller 104 can also use one or more protocols 232 and/or one or more algorithms 233 to determine the colors of an object 140 captured in an image by an image capturing device 175. The control engine 206 of the controller 104 can further use one or more protocols 232 and/or one or more algorithms 233 to match one object 140 with another object 140 (whether in the volume of space 199, in another volume of space 199 (another room of a house), or on an external site 185) based on one or more colors of those objects 140, the function of those objects 140, some other factor, or any combination thereof.

In certain example embodiments, the controller 104 of the user device 155 can receive communication signals from one or more of the external sites 185 and/or the network manager 180. In such a case, the control engine 206 of the controller 104 can use the protocols 232 and/or the algorithms 233 to receive such communication signals and interpret the content of those communication signals. In some cases, the control engine 206 of the controller 104 can use the protocols 232 and/or the algorithms 233, as well as measurements from one or more of the sensor devices 165, to determine characteristics (e.g., color, shape, size, identification) of an object 140.

The control engine 206 can provide control, communication, and/or other similar signals to the network manager 180, the sensor devices 165, the one or more image capturing devices 175, and the one or more external sites 185. Similarly, the control engine 206 can receive control, communication, and/or other similar signals from the network manager 180, the sensor devices 165, the one or more image capturing devices 175, and the one or more external sites 185.

The control engine 206 can communicate with the network manager 180, the sensor devices 165, the one or more image capturing devices 175, and/or the one or more external sites 185 automatically (for example, based on one or more algorithms 233 stored in the storage repository 230) and/or based on control, communication, and/or other similar signals received from another component (e.g., an image capturing device 175, an external site 185) using communication signals. The control engine 206 may include a printed circuit board, upon which the hardware processor 220 and/or one or more discrete components of the controller 104 are positioned.

In certain embodiments, the control engine 206 of the controller 104 can communicate with one or more components of a system external to the system 100. For example, the control engine 206 can interact with an inventory management system by ordering a replacement for an image capturing device 175 that the control engine 206 has determined to fail or be failing. As another example, the control engine 206 can interact with a workforce scheduling system by scheduling a maintenance crew to repair or replace the image capturing device 175 (or portion thereof) when the control engine 206 determines that the image capturing device 175 or portion thereof requires maintenance or replacement. In this way, the controller 104 is capable of performing a number of functions beyond what could reasonably be considered a routine task.

In certain example embodiments, the control engine 206 can include an interface that enables the control engine 206 to communicate with one or more components other (e.g., the power supply 140, an image capturing device 175 a sensor device 165, the user interface 129) of the user device 155. Such an interface can operate in conjunction with, or independently of, the protocols 232 used to communicate between the controller 104 and the network manager 180 and the one or more external sites 185.

The control engine 206 (or other components of the controller 104) can also include one or more hardware and/or software architecture components to perform its functions. Such components can include, but are not limited to, a universal asynchronous receiver/transmitter (UART), a serial peripheral interface (SPI), a direct-attached capacity (DAC) storage device, an analog-to-digital converter, an inter-integrated circuit ($I^2C$), and a pulse width modulator (PWM).

The communication network (using the communication links 105) of the system 100 can have any type of network architecture. For example, the communication network of the system 100 can be a mesh network. As another example, the communication network of the system 100 can be a star network. When the controller 104 includes an energy storage device (e.g., a battery as part of the power module 212), even more power can be conserved in the operation of the system 100. In addition, using time-synchronized communication protocols 232, the data transferred between the controller 104, the network manager 180, the sensor devices 165, the image capturing devices 175, and the external sites 185 can be secure.

The color recognition module 236 of the controller 104 is configured to identify and categorize each color in an image. More specifically, the color recognition module 236 can be configured to recognize each color of each object 140 in an image, regardless of whether the image is captured by an image capturing device 175 of the user device 155, is a stored image 231, or is an external image 187 located on an external site 185. In some cases, the color recognition module 236, working in conjunction with the control engine 206, one or more algorithms 233, and/or one or more protocols 232, can adjust for lighting (e.g., low lighting, bright lighting, lighting with biased colors and/or temperatures) and/or other ambient conditions in the volume of space 199 to identify true colors of each object 140. In some cases, the color recognition module 236 can use information on one or more external sites 185 to identify and/or categorize a color. The color recognition module 236 can make additions, deletions, and/or modifications to some or all of its color identification and/or categorization functions based on any of a number of factors, including but not limited to adjustments in light of actual data, user preferences over time, changes in lighting in the volume of space 199.

The profile module 237 of the controller 104 is configured to generate one or more profiles of the user 150. A profile describes preferences of the user 150 in terms of one or more characteristics (e.g., style, size, color, materials). Examples of a profile can include, but are not limited to, a clothing style preference, a jewelry style preference, an accessory style preference, a color preference, a flower preference, a plant preference, and a food preference. A profile established and/or maintained by the profile module 237 can be based on one or more of a number of factors, including but not limited to user preferences, feedback from the user 150, results of previous profiles generated by the profile module 237 for the user 150, recent selections made by the user 150, recommendations made by the analysis module 235, and current fashion trends. A profile generated by the profile module 237 can be stored in the storage repository 230 as stored data 234.

A profile may be generated and maintained by the profile module 237 using inputs from the user 150, one or more external sites 185, the network manager 180, one or more algorithms 233, one or more protocols 232, other profiles, other factors, or any suitable combination thereof. The profiles generated and maintained by the profile module 237 over time can lead to adjustments in one or more of the protocols 232 and/or one or more of the algorithms 233, resulting in self-learning or other form of artificial intelligence outputs that are used by the profile module 237 to adjust an existing profile and/or generate a new profile.

As an example, a profile can be or include that the user 150 prefers to wear men's clothes that favor the latest French fashion trends in size medium and with colors that feature or complement red colors that favor toward blue (as opposed to orange) hues. As another example, a profile can be or include that the user 150 prefers to wear matching women's pendants and clip-on drop earrings (no longer than 4" in total) with blue, green, and/or purple gemstones and silver necklaces between 16" and 24".

The analysis module 235 of the controller 104 is configured to analyze the color data identified and categorized by the color recognition module 236 and/or the profiles established and maintained by the profile module 237. The analysis module 235 can perform its functions in conjunction with the control engine 206, one or more algorithms 233, and/or one or more protocols 232. In some cases, the analysis module 235 can use information (e.g., external images 187, data, prices, quantity available, materials, descriptions of external images 187, current fashion trends) provided by one or more external sites 185 to perform one or more analyses. The analysis module 235 can make additions, deletions, and/or modifications to some or all of its analytical function based on any of a number of factors, including but not limited to adjustments in light of actual data, user preferences over time, changes in public health information, and changes in fashion trends.

The analysis performed by the analysis module 235 can include, but is not limited to, the identification of an object 140, regardless of whether the object 140 is located in the volume of space 199 (e.g., captured by an image capturing device 175 of the user device 155, captured in a stored image 231) or not located in the volume of space 199 (e.g., captured in a stored image 231, captured in an external image 187 located on an external site 185). In alternative embodiments, the identification of an object 140 can be performed by another component (e.g., the network manager 180, an external site 185) of the system 100 aside from the user device 155. The identification of an object 140 can be with respect to a broad category (e.g., clothes, shoes, jewelry, food), an intermediate category (e.g., a shirt, a necklace, a dress shoe, a fruit), a specific category (e.g., a woman's blouse, pearl earrings, a canvas loafer, an orange), and/or any other type of category. An object 140 can be part of an image captured by an image capturing device 175, part of a stored image 231, or part of an external image 187.

The analysis performed by the analysis module 235 can additionally or alternatively include the categorization (e.g., dress socks, size of shirts, material of pants, style of jacket, condition of shoes, color of hats, type of food) of an object 140. Categorizing objects 140 can include the creation and maintenance of one or more data tables by the analysis module 235. Such tables can be part of the stored data 234. An object 140 can have more than one categorization (e.g., clothing, men's top, and T-shirt). The analysis module 235 can determine which categories to establish and maintain. In addition, or in the alternative, the user 150 can instruct the analysis module 235 as to which categories to establish and maintain.

Categories can be defined based on color, style, texture and/or other criteria based on consultations with fashion experts and/or other types of external sites 185. Once the categories are identified, defined, and stored, the analysis module 235 can classify objects 140 and generate counts for each applicable category. The categorization by the analysis module 235 can be applied to any collection of images, including but not limited to images of objects 140 in closets, images of objects in grocery stores, images of objects (e.g., food items) in refrigerators, and images (files) of objects (e.g., documents) containing color.

The analysis performed by the analysis module 235 can additionally or alternatively keep a running count of objects 140 in a given category. The analysis module 235 can communicate with the profile module 237 to generate and maintain the count of objects 140 in each category established by the analysis module 235 for each profile. For example, a category can be straight cut men's jeans, and the count can be 3. As another example, a category can be boys' wide leg jeans, and the count can be 1. As still another example, a category can be women's skinny jeans, and the count can be 0.

The analysis performed by the analysis module 235 can additionally or alternatively include determining the compatibility of one object 140 with one or more other objects 140. The compatibility can be based on one or more of a number of factors, including but not limited to the purpose for which the objects 140 are to be used, color, categorization, size (e.g., based on reading the text on a label, based on taking virtual measurements), and gender use. An object 140 that is part of the compatibility analysis by the analysis modules 235 can be located in the volume of space 199, in another volume of space to which the user 150 has access, or at a remote location (e.g., accessible through an external site 185). If the analysis module 235 determines that 2 or more objects 140 are compatible with each other for a particular purpose (e.g., the creation of a clothing/accessory outfit), then the analysis modules 235 can recommend that those objects 140 be paired together for that purpose.

The analysis performed by the analysis module 235 can additionally or alternatively include applying one or more objects 140 and/or one or more colors to a profile established by the profile module 237. For example, the analysis module 235 can identify an object 140 (e.g., in terms of style, in terms of an article of clothing, in terms of a type of accessory, in terms of a color) that the analysis module 235 finds compatible with a profile established by the profile module 237. Such an object 140 can fill a need or projected need of the user 150. As a specific example, the analysis module 235 can locate and identify a purple handbag, found on an external site 185, that is of a style that fits a profile for a user 150, as established by the profile module 237. In such a case, the user 150 can be in need of a handbag. Alternatively, the user 150 can be in the market to add a handbag to a collection of handbags.

Such an object 140 can be from the volume of space 199, an area adjacent to the volume of space 199, a stored image 231, an external image 187, and/or an external site 185. Similarly, such a color can be from an object 140 in the volume of space 199, an object 140 in an area adjacent to the volume of space 199, part of a stored image 231, part of an external image 187, and/or part of an external site 185. In certain example embodiments, the analysis module 235 and the profile module 237 can interact to determine whether an object 140 and/or a color associated with the object 140 being analyzed by the analysis module 235 falls within a profile generated by the profile module 237. For example, if a profile is for men's clothing from a Western Europe fashion from 1985, the analysis module 235 and the profile module 237 can interact to determine whether a power blue men's shirt falls within the profile.

The analysis performed by the analysis module 235 can additionally or alternatively include determining that additional information is required before a recommendation can be generated. Such additional information can be with respect to the object 140 that is the subject of the analysis (also called the subject object 140 herein), another object 140 in the volume of space 199, an object in a stored image 231, an object in an external image 187, and/or some other object. The additional information needed can be with respect to identifying the object 140 (e.g., the type of article of clothing), with respect to confirming/identifying additional colors of the object 140, with respect to identifying details (e.g., a size of an article of clothing, a shape of an item of jewelry) about the object 140

The communication module 208 of the controller 104 determines and implements the communication protocol (e.g., from the protocols 232 of the storage repository 230) that is used when the control engine 206 communicates with (e.g., sends signals to, receives signals from) the network manager 180, the sensor devices 165, the image capturing devices 175, and/or the external sites 185. In some cases, the communication module 208 accesses the stored data 234 to determine which communication protocol is within the capability of the network manager 180, the sensor devices 165, the image capturing devices 175, and/or the external sites 185 for a communication signal sent by the control engine 206. In addition, the communication module 208 can interpret the communication protocol of a communication signal received by the controller 104 (e.g., from an external site 185, from the network manager 180) so that the control engine 206 can interpret the contents of the communication signal.

The communication module 208 can send and receive data between the network manager 180, the sensor devices 165, the image capturing devices 175, and/or the external sites 185 and the controller 104. The communication module 208 can send and/or receive data in a given format that follows a particular protocol 232. The control engine 206 can interpret the data packet received from the communication module 208 using a protocol 232 stored in the storage repository 230.

The communication module 208 can send data (e.g., protocols 232, stored data 234) directly to and/or retrieve data directly from the storage repository 230. Alternatively, the control engine 206 can facilitate the transfer of data between the communication module 208 and the storage repository 230. The communication module 208 can also provide encryption to data that is sent by the controller 104 and decryption to data that is received by the controller 104. The communication module 208 can also provide one or more of a number of other services with respect to data sent from and received by the controller 104. Such services can include, but are not limited to, data packet routing information and procedures to follow in the event of data interruption.

The timer 210 of the controller 104 can track clock time, intervals of time, an amount of time, and/or any other measure of time. The timer 210 can also count the number of occurrences of an event, whether with or without respect to time. Alternatively, the control engine 206 can perform the counting function. The timer 210 is able to track multiple time measurements concurrently. The timer 210 can track time periods based on an instruction received from the control engine 206, based on an instruction received from another components (e.g., a user 150 (including an associated user system 155, the network manager 180), based on an instruction programmed in the software for the controller 104, based on some other condition or from some other component, or from any combination thereof.

The timer 210 can be configured to track time when there is no power delivered to the controller 104 (e.g., the power module 212 malfunctions) using, for example, a super capacitor or a battery backup. In such a case, when there is a resumption of power delivery to the controller 104, the timer 210 can communicate any aspect of time to the controller 104. In such a case, the timer 210 can include one or more of a number of components (e.g., a super capacitor, an integrated circuit) to perform these functions.

The power module 212 of the controller 104 provides power to one or more other components (e.g., timer 210, control engine 206) of the controller 104. In addition, in certain example embodiments, the power module 212 can provide power to the power supply 240 of the user device 155. The power module 212 can include one or more of a number of single or multiple discrete components (e.g., transistor, diode, resistor), and/or a microprocessor. The power module 212 may include a printed circuit board, upon which the microprocessor and/or one or more discrete components are positioned. In some cases, the power module 212 can include one or more components that allow the power module 212 to measure one or more elements of power (e.g., voltage, current) that is delivered to and/or sent from the power module 212.

The power module 212 can include one or more components (e.g., a transformer, a diode bridge, an inverter, a converter) that receives power (for example, through an electrical cable) from the power supply 240. The power module 212 can then subsequently generate power of a type (e.g., alternating current, direct current) and level (e.g., 12V, 24V, 120V) that can be used by the other components of the controller 104. In addition, or in the alternative, the power module 212 can or include be a source of power in itself to provide signals to the other components of the controller 104. For example, the power module 212 can be or include an energy storage device (e.g., a battery). As another example, the power module 212 can be or include a localized photovoltaic power system.

The power module 212 can use a closed control loop to maintain a preconfigured voltage or current with a tight tolerance at the output. The power module 212 can also protect the rest of the electronics (e.g., hardware processor 220, transceiver 224) in the user device 155 from surges generated in the line. The power module 212 can also have sufficient isolation in the associated components of the power module 212 (e.g., transformers, opto-couplers, current and voltage limiting devices) so that the power module 212 is certified to provide power to an intrinsically safe circuit.

In certain example embodiments, the power module 212 of the controller 104 can also provide power and/or control signals, directly or indirectly, to one or more of the sensor devices 165. In such a case, the control engine 206 can direct the power generated by the power module 212 to the sensor devices 165 of the user device 155. In this way, power can be conserved by sending power to the sensor devices 165 of the user device 155 when those devices need power, as determined by the control engine 206.

The hardware processor 220 of the controller 104 executes software in accordance with one or more example embodiments. Specifically, the hardware processor 220 can execute software on the control engine 206 or any other portion of the controller 104, as well as software used by the network manager 180, the sensor devices 165, one or more of the external sites 185, and/or one or more of the image capturing devices 175. The hardware processor 220 can be or include an integrated circuit (IC), a central processing unit, a multi-core processing chip, a multi-chip module including multiple multi-core processing chips, or other hardware processor in one or more example embodiments. The hardware processor 220 can be known by other names, including but not limited to a computer processor, a microprocessor, and a multi-core processor.

In one or more example embodiments, the hardware processor 220 executes software instructions stored in memory 222. The memory 222 includes one or more cache memories, main memory, and/or any other suitable type of memory. The memory 222 is discretely located within the controller 104 relative to the hardware processor 220 according to some example embodiments. In certain configurations, the memory 222 can be integrated with the hardware processor 220.

In certain example embodiments, the controller 104 does not include a hardware processor 220. In such a case, the controller 104 can include, as an example, one or more field programmable gate arrays (FPGA), one or more insulated-gate bipolar transistors (IGBTs), and/or one or more ICs. Using FPGAs, IGBTs, ICs, and/or other similar devices known in the art allows the controller 104 (or portions thereof) to be programmable and function according to certain logic rules and thresholds without the use of a hardware processor 220. Alternatively, FPGAs, IGBTs, ICs, and/or similar devices can be used in conjunction with one or more hardware processors 220.

The transceiver 224 of the controller 104 can send (using a transmitter) and/or receive (using a receiver) control and/or communication signals, including RF signals. Specifically, the transceiver 224 can be used to transfer data between the controller 104 and the network manager 180, one or more of the sensor devices 165, one or more of the image capturing devices 175, and/or one or more of the external sites 185. The transceiver 224 can use wired and/or wireless technology. The transceiver 224 can be configured in such a way that the control and/or communication signals sent and/or received by the transceiver 224 can be received and/or sent by another transceiver that is part of the network manager 180, one or more sensor devices 165, one or more of the image capturing devices 175, and/or one or more of the external sites 185.

When the transceiver 224 uses wireless technology, any type of wireless technology can be used by the transceiver 224 in sending and receiving communication signals (e.g., RF signals). Such wireless technology can include, but is not limited to, Wi-Fi, visible light communication, infrared, cellular networking, 802.15.4 wireless, 5G cellular wireless, Zigbee, BLE, UWB, and Bluetooth. For example, the transceiver 224 can include a Zigbee transmitter, a Zigbee receiver, a BLE receiver, a BLE transmitter, an active IR transmitter, and/or an active IR receiver. The transceiver 224 can use one or more of any number of suitable communication protocols (e.g., ISA100, HART) when sending and/or receiving communication signals, including RF signals. Such communication protocols can be stored in the protocols 232 of the storage repository 230. Further, any transceiver information for the network manager 180, the sensor devices 165, the image capturing devices 175, and/or the external sites 185 can be part of the stored data 234 (or similar areas) of the storage repository 230.

Optionally, in one or more example embodiments, the security module 228 secures interactions between the controller 104, the network manager 180, the sensor devices 165, the image capturing devices 175, and/or the external sites 185. More specifically, the security module 228 authenticates communication from software based on security keys verifying the identity of the source of the communication. For example, user software may be associated with a security key enabling the software of the network manager 180 to interact with the controller 104 of the user device 155. Further, the security module 228 can restrict receipt of information, requests for information, and/or access to information in some example embodiments.

As mentioned above, aside from the controller 104 and its components, the user device 155 can include a power supply 140, one or more sensor devices 165, one or more image capturing devices 175, and a user interface 129. The power supply 140 of the user device 155 provides power to one or more other components (e.g., the controller 104) of the user device 155. The power supply 240 can be substantially the same as, or different than, the power module 212 of the controller 104. The power supply 240 can include one or more of a number of single or multiple discrete components (e.g., transistor, diode, resistor), and/or a microprocessor. The power supply 240 may include a printed circuit board, upon which the microprocessor and/or one or more discrete components are positioned.

The power supply 240 can include one or more components (e.g., a transformer, a diode bridge, an inverter, a converter) that receives power (for example, through an electrical cable) from a power source (e.g., AC mains), manipulates (e.g., transforms, inverts, converts) that power, and subsequently sends the manipulated power to the power module 212 of the controller 104. The power supply 240 can generate power of a type (e.g., alternating current, direct current) and level (e.g., 12V, 24V, 120V) that can be used by the recipients (e.g., the sensor devices 165, the controller 104) of such power. In addition, or in the alternative, the power supply 240 can receive power from a source external to the user device 155. In addition, or in the alternative, the power supply 240 can be or include a source of power in itself. For example, the power supply 240 can be or include an energy storage device (e.g., a battery), a localized photovoltaic power system, and/or some other source of independent power.

Each of the one or more sensor devices 165 of the user device 155 can include one or more of any type of sensor that measures one or more parameters. Examples of types of sensors of a sensor device 165 can include, but are not limited to, a camera, a passive infrared sensor, a photocell, a pressure sensor, an air flow monitor, a gas detector, and a resistance temperature detector. Examples of a parameter that is measured by a sensor device 165 can include, but are not limited to, presence of an object 140 in the volume of space 199, occupancy in the volume of space 199, motion in the volume of space 199, a temperature, level of humidity, an amount of ambient light in the volume of space 199, and an amount of weight.

A sensor device 165 can be an integrated sensor (also sometimes called an integrated sensor device 165). In integrated sensor has both the ability to sense and measure at least one parameter and the ability to communicate with another component (e.g., the controller 104). The communication capability of a sensor device 165 that is an integrated sensor can include one or more communication devices that are configured to communicate with, for example, the controller 104 of the user device 155, an external site 185, an image capturing device 175, and/or the network manager 180.

Each sensor device 165, whether integrated or not, can use one or more of a number of communication protocols. This allows a sensor device 165 to communicate with one or more components (e.g., the control engine 206 of the controller 104, one or more other integrated sensor devices 165) of the system 100. The communication capability of a sensor device 165 that is an integrated sensor can be dedicated to the sensor device 165 and/or shared with the controller 104 of the user device 155. When the system 100 includes multiple integrated sensor devices 165, one integrated sensor device 165 can communicate, directly or indirectly, with one or more of the other integrated sensor devices 165 in the system 100.

If the communication capability of a sensor device 165 that is an integrated sensor is dedicated to the sensor device 165, then the sensor device 165 can include one or more components (e.g., a transceiver 224, a communication module 208), or portions thereof, that are substantially similar to the corresponding components described above with respect to the controller 104. A sensor device 165 can be integrated with the user device 155, can be a stand-alone device, and/or can be integrated with another component in the system 100. A sensor device 165 can be located within the housing 128 of the user device 155, disposed on the housing 128 of the user device 155, or located outside the housing 128 of the user device 155.

In certain example embodiments, a sensor device 165 can include an energy storage device (e.g., a battery) that is used to provide power, at least in part, to some or all of the sensor device 165. In such a case, the energy storage device can be the same as, or independent of, an energy storage device or other power supply 240 of the user device 155. The optional energy storage device of the sensor device 165 can operate at all times or when the power supply 240 of the user device 155 is interrupted. Further, a sensor device 165 can utilize or include one or more components (e.g., memory 222, storage repository 230, transceiver 224) found in the controller 104. In such a case, the controller 104 can provide the functionality of these components used by the sensor device 165. Alternatively, the sensor device 165 can include, either on its own or in shared responsibility with the controller 104, one or more of the components of the controller 104. In such a case, the sensor device 165 can correspond to a computer system as described below with regard to FIG. 3.

Each image capturing device 175 of the user device 155 is configured to capture one or more images in the volume of space 199. An image captured by an image capturing device 175 can include one or more objects 140. An image capturing device 175 can be or include a movie camera, a still camera, or any other type of camera. As such, an image captured by an image capturing device 175 can be or include a still image, a series of still images, a live shot, and/or a moving image (e.g., a video). In some cases, an image capturing device 175 can include or be connected to a microphone, speaker, or other audio device to detect sound and/or emit sound associated with an image captured by the image capturing device 175. When the user device 155 includes multiple image capturing devices 175, one image capturing device 175 can work independently of or in conjunction with one or more of the other image capturing devices 175.

Each image capturing device 175 is configured to capture one or more images of one or more objects 140 within the volume of space 199. Specifically, each image capturing device has a line of sight 109 into the volume of space 199. The range (e.g., defined by an angle 107) of the line of sight 109 can be fixed or adjustable (e.g., by a user 150, automatically by the controller 104). In addition, or in the alternative, when an image capturing device 175 is part of the user device 155, the user device 155 can be moved to move the line of sight 109 of the image capturing device 175. When an object 140 is within the line of sight 109 of the image capturing device 175, the object 140 can be captured in an image taken by the image capturing device 175. An image capturing device 175 can have or include the capability of a geolocation service so that the location of each image can be ascertained. Further, an image capturing device 175 can have or include the capability of a timestamp so that the date and time that each image is taken can be ascertained.

The user interface 129 of the user device 155 is configured to allow the user 150 to interact with (e.g., control, communicate with) the user device 155. The user interface 129 can include one or more of a number of components that require physical interaction (e.g., a touch screen, a pushbutton, a switch, a dial) disposed on the housing 128 of the user device 155 and/or non-physical interaction (e.g., a microphone that receives voice control, a camera that captures gestures, a speaker that broadcasts recommendations and/or requests for additional input from the user 150). The user interface 129 can be configured to receive instructions, requests, user preferences, settings, and/or other inputs from the user 150.

Figure 3:
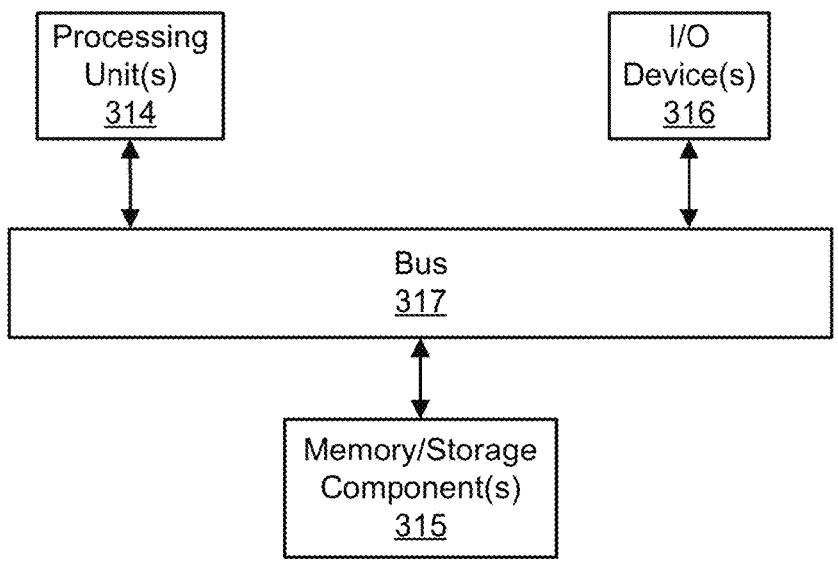
FIG. 3 shows a computing system in accordance with certain example embodiments.

FIG. 3 illustrates one embodiment of a computing device 318 that implements one or more of the various techniques described herein, and which is representative, in whole or in part, of the elements described herein pursuant to certain exemplary embodiments. For example, the controller 104 of the user device 155 (including components thereof, such as the control engine 206, the hardware processor 220, the storage repository 230, and the transceiver 224) can be considered a computing device 318. Computing device 318 is one example of a computing device and is not intended to suggest any limitation as to scope of use or functionality of the computing device and/or its possible architectures. Neither should the computing device 318 be interpreted as having any dependency or requirement relating to any one or combination of components illustrated in the example computing device 318.

Computing device 318 includes one or more processors or processing units 314, one or more memory/storage components 315, one or more input/output (I/O) devices 316, and a bus 317 that allows the various components and devices to communicate with one another. Bus 317 represents one or more of any of several types of bus structures, including a memory bus or memory controller, a peripheral bus, an accelerated graphics port, and a processor or local bus using any of a variety of bus architectures. Bus 317 includes wired and/or wireless buses.

Memory/storage component 315 represents one or more computer storage media. Memory/storage component 315 includes volatile media (such as random access memory (RAM)) and/or nonvolatile media (such as read only memory (ROM), flash memory, optical disks, magnetic disks, and so forth). Memory/storage component 315 includes fixed media (e.g., RAM, ROM, a fixed hard drive, etc.) as well as removable media (e.g., a Flash memory drive, a removable hard drive, an optical disk, and so forth).

One or more I/O devices 316 allow a customer, utility, or other user to enter commands and information to computing device 318, and also allow information to be presented to the customer, utility, or other user and/or other components or devices. Examples of input devices include, but are not limited to, a keyboard, a cursor control device (e.g., a mouse), a microphone, a touchscreen, and a scanner. Examples of output devices include, but are not limited to, a display device (e.g., a monitor or projector), speakers, outputs to a lighting network (e.g., DMX card), a printer, and a network card.

Various techniques are described herein in the general context of software or program modules. Generally, software includes routines, programs, objects, components, data structures, and so forth that perform particular tasks or implement particular abstract data types. An implementation of these modules and techniques are stored on or transmitted across some form of computer readable media. Computer readable media is any available non-transitory medium or non-transitory media that is accessible by a computing device. By way of example, and not limitation, computer readable media includes "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, cloud-based storage, CD-ROM, digital versatile disks (DVD) or other optical storage, magnetic cassettes, magnetic tape, magnetic disk storage or other magnetic storage devices, or any other medium which is used to store the desired information and which is accessible by a computer.

The computer device 318 is connected to a network (not shown) (e.g., a LAN, a WAN such as the Internet, cloud, or any other similar type of network) via a network interface connection (not shown) according to some exemplary embodiments. Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means take other forms, now known or later developed, in other exemplary embodiments. Generally speaking, the computer device 318 includes at least the minimal processing, input, and/or output means necessary to practice one or more embodiments.

Further, those skilled in the art will appreciate that one or more elements of the aforementioned computer device 318 is located at a remote location and connected to the other elements over a network in certain exemplary embodiments. Further, one or more embodiments is implemented on a distributed system having one or more nodes, where each portion of the implementation (e.g., the control engine 206) is located on a different node within the distributed system. In one or more embodiments, the node corresponds to a computer system. Alternatively, the node corresponds to a processor with associated physical memory in some exemplary embodiments. The node alternatively corresponds to a processor with shared memory and/or resources in some exemplary embodiments.

Figure 4:
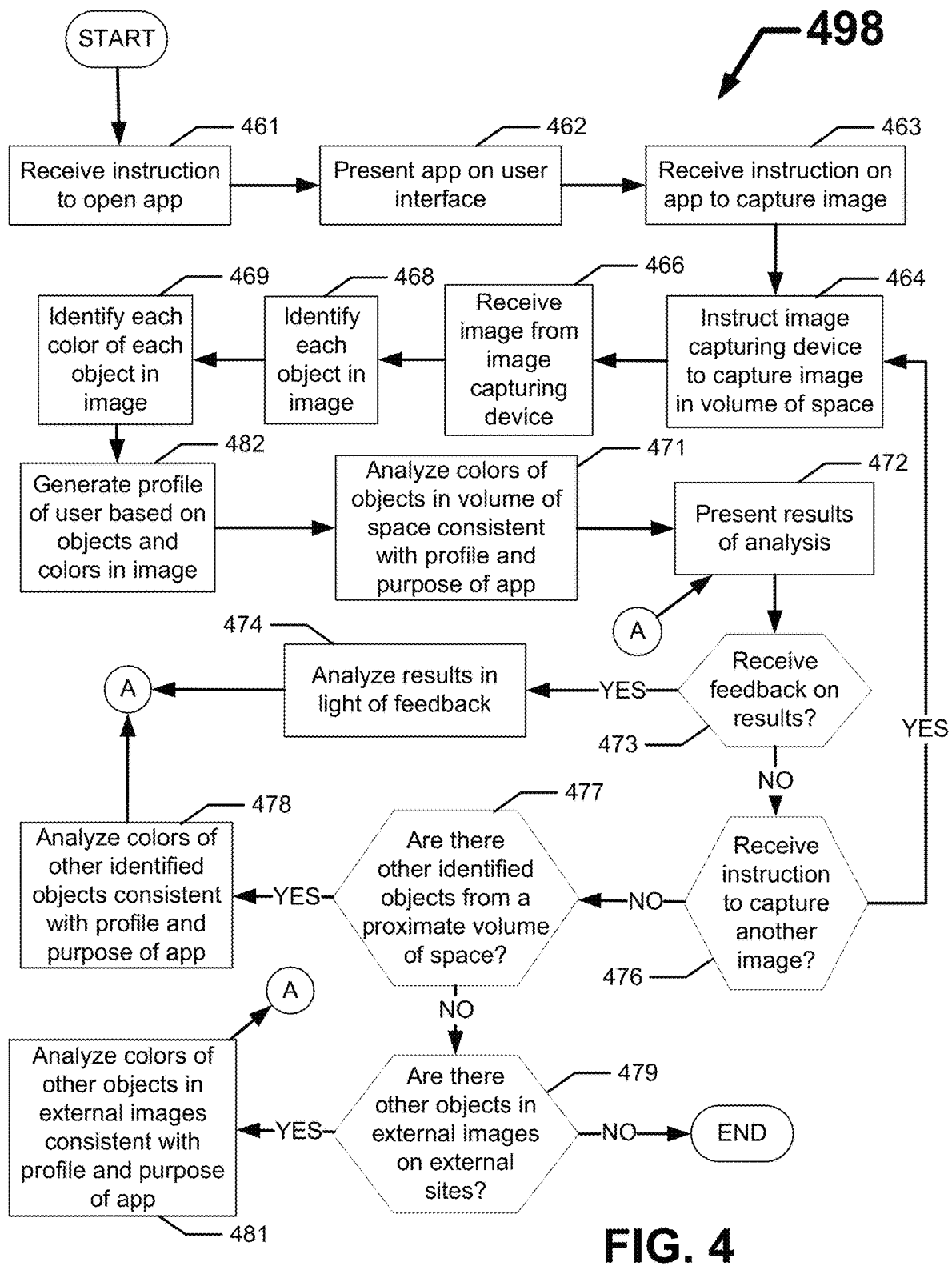
FIG. 4 shows a flowchart of a method for user assistance based on color recognition in accordance with certain example embodiments.
Figure 5:
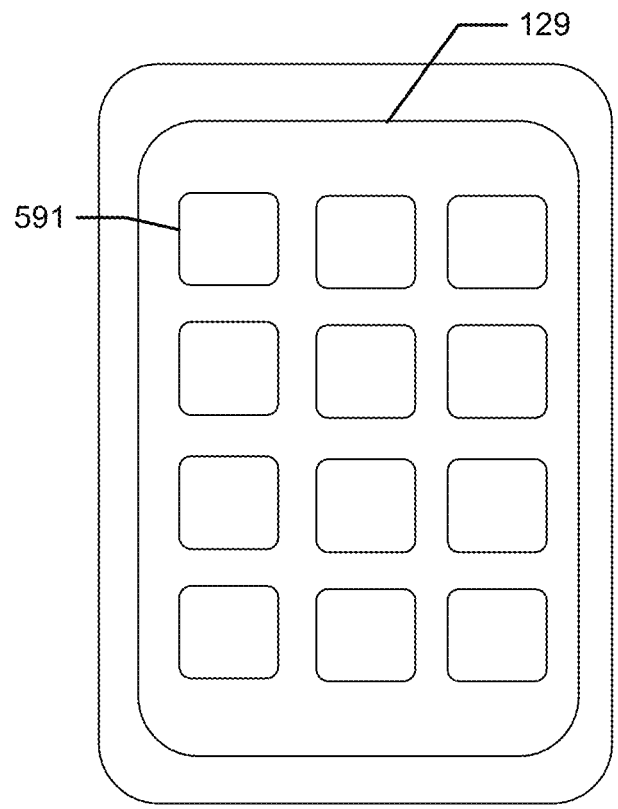
FIGS. 5 through 10 show various stages of an example of user assistance based on color recognition following the method of FIG. 4.
Figure 6:
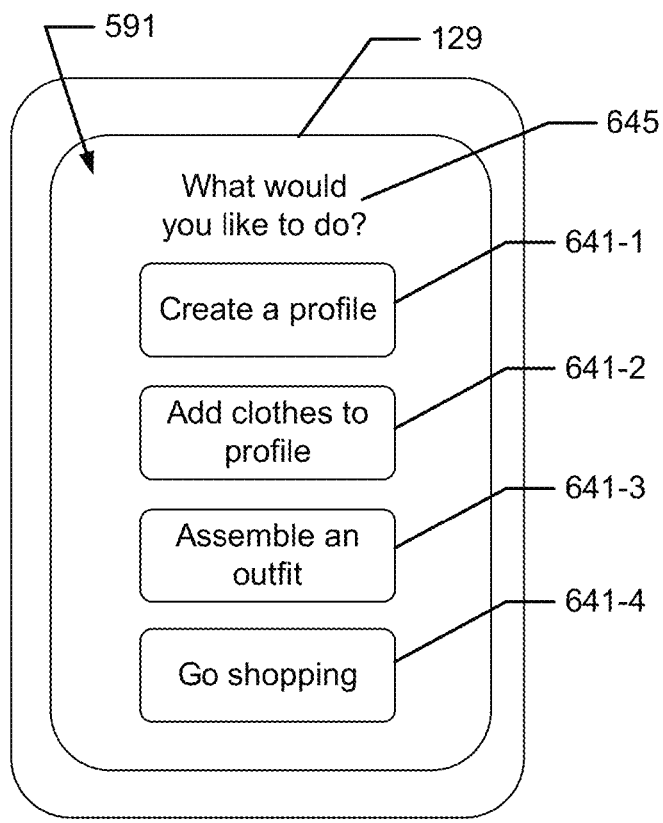
Figure 7:
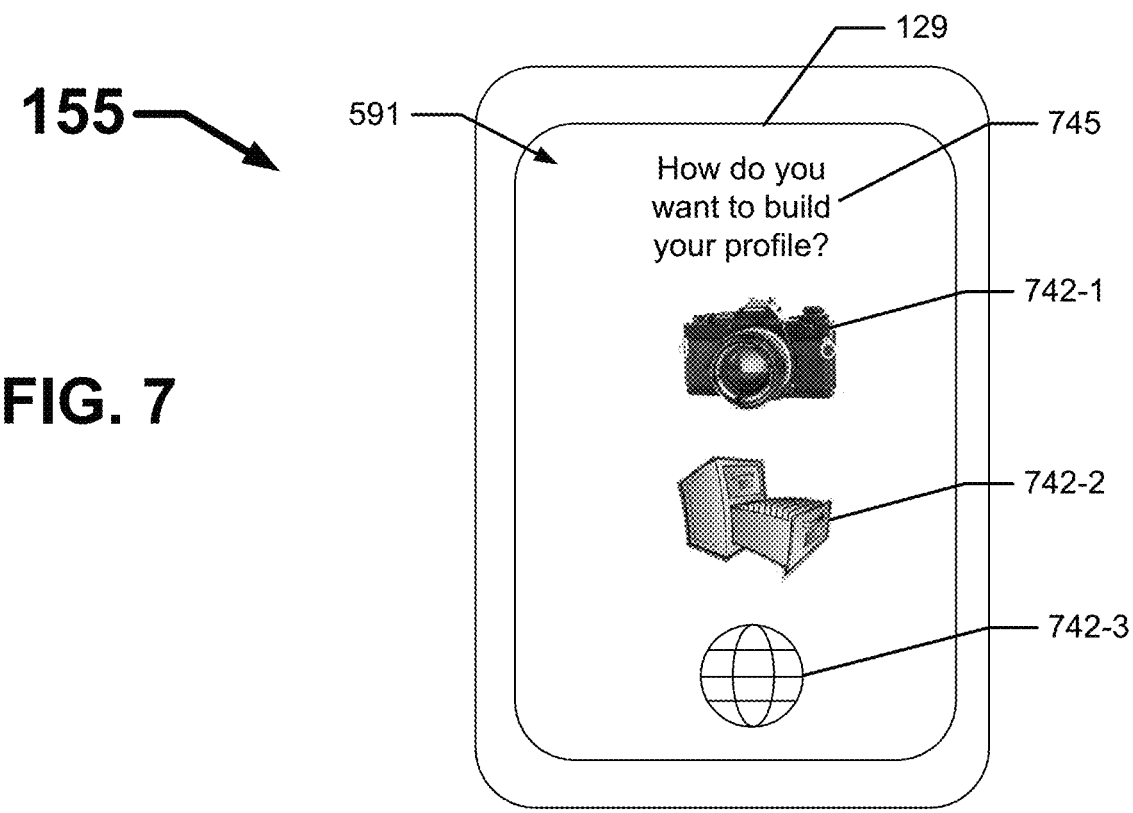
Figure 8A:
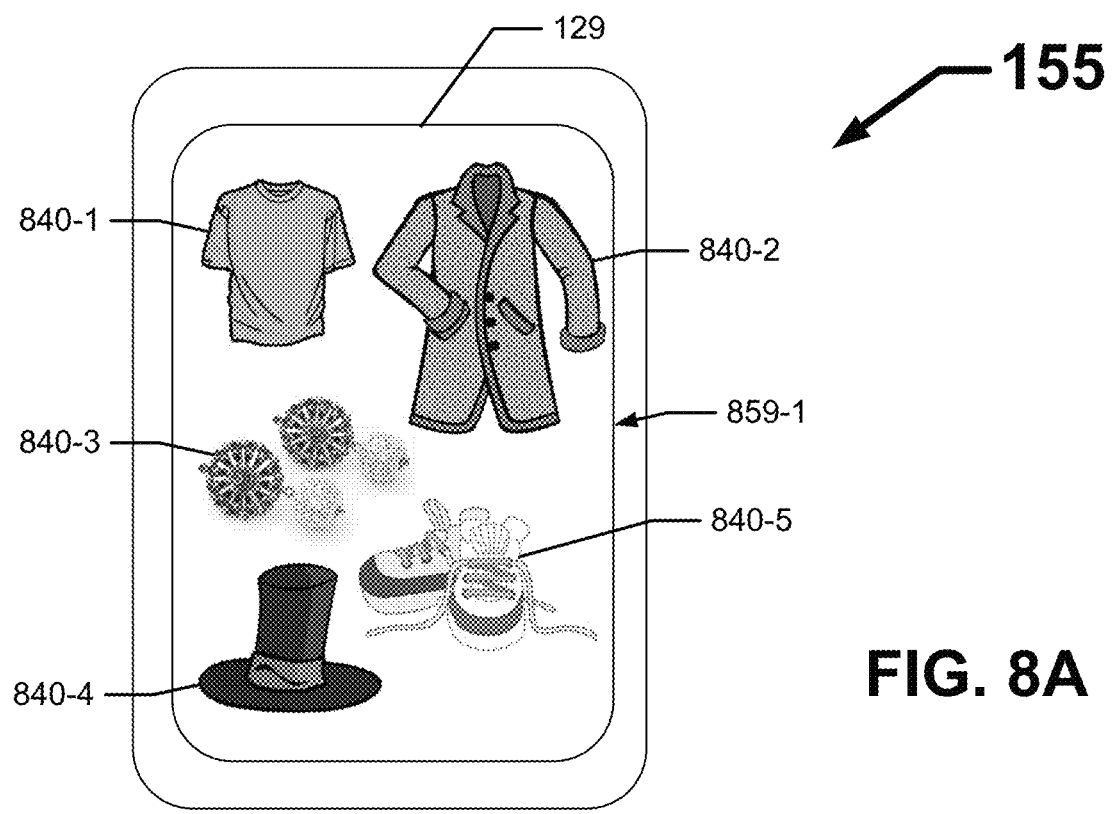
Figure 8B:
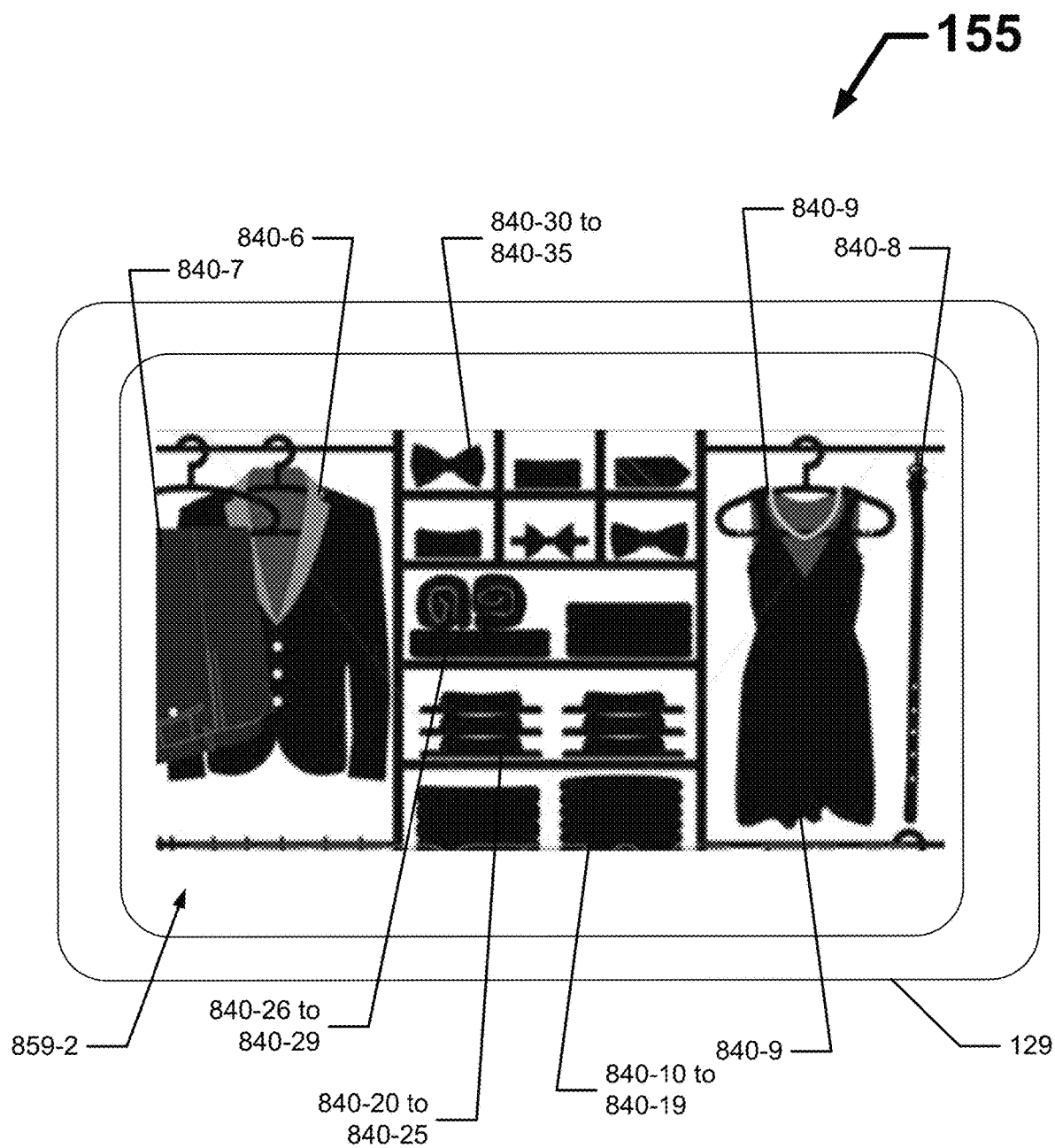
Figure 9:
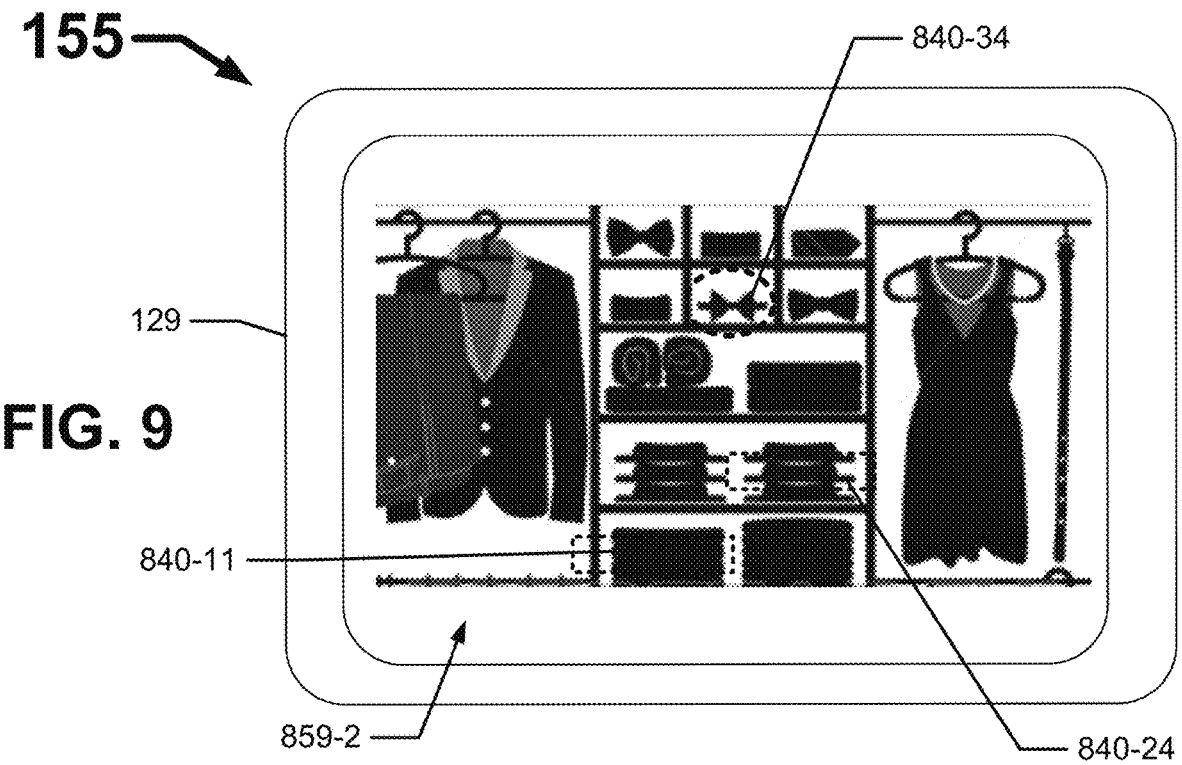
Figure 10:
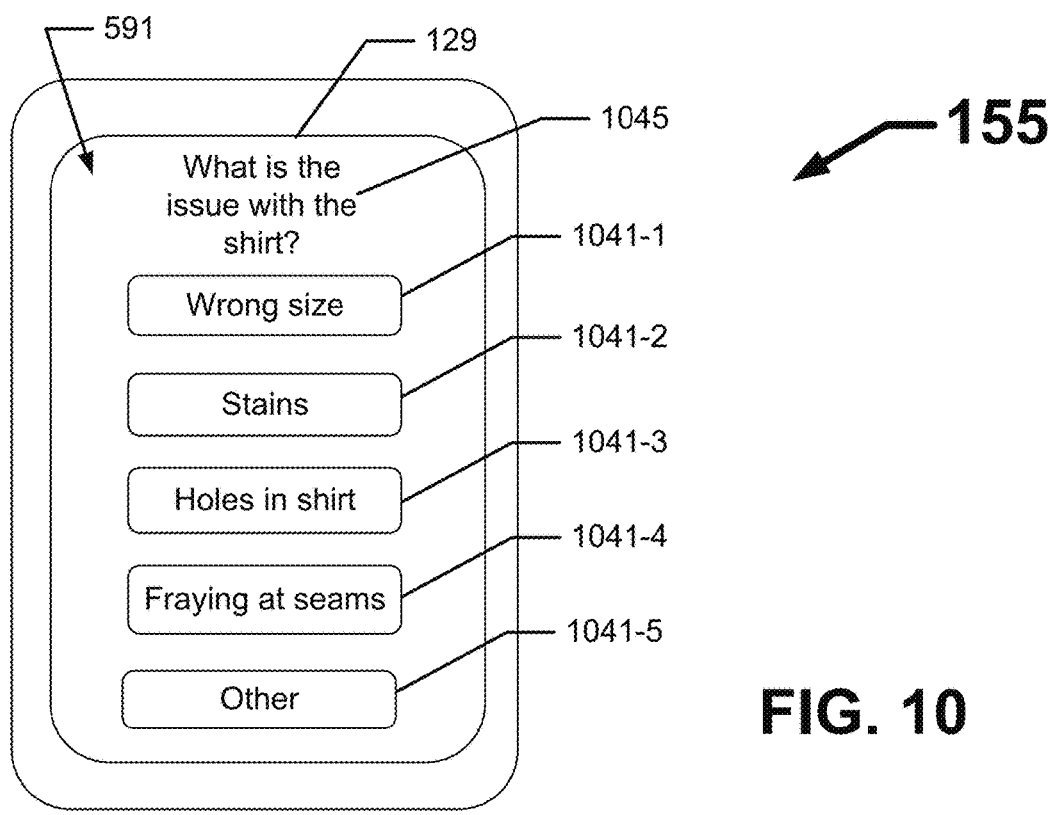

FIG. 4 shows a flowchart of a method 498 for user assistance based on color recognition in accordance with certain example embodiments. FIGS. 5 through 10 show various snapshots of the user interface 129 of the user device 155 while following the method 498 of FIG. 4. Specifically, FIG. 5 shows a snapshot of the user interface 129 that displays the app 591 used in the method 498. FIG. 6 shows an example of the app 591 once opened. FIG. 7 shows an example of the app 591 seeking instructions to capture an image. FIGS. 8A and 8B each shows the user interface 129 displaying an image 859 with multiple objects 840. FIG. 9 shows an example of a user interface 129 of a user device 155 used to present the results of an analysis. FIG. 10 shows an example of a user interface 129 of a user device 155 used to request feedback from a user 150.

While the various steps in this method 498 are presented sequentially, one of ordinary skill will appreciate that some or all of the steps may be executed in different orders, may be combined or omitted, and some or all of the steps may be executed in parallel. Further, in one or more of the example embodiments, one or more of the steps shown in this example method may be omitted, repeated, and/or performed in a different order.

In addition, a person of ordinary skill in the art will appreciate that additional steps not shown in FIG. 4 may be included in performing this method. Accordingly, the specific arrangement of steps should not be construed as limiting the scope. Further, a particular computing device, such as the computing device discussed above with respect to FIG. 3, can be used to perform one or more of the steps for the methods shown in FIG. 4 in certain example embodiments. Any of the functions performed below by a controller (e.g., controller 104) of a user device (e.g., user device 155) can involve the use of one or more stored images 231, one or more protocols (e.g., protocols 232), one or more algorithms (e.g., algorithms 233), and/or stored data (e.g., stored data 234) stored in a storage repository (e.g., storage repository 230).

The method 498 shown in FIG. 4 is merely an example that can be performed by using an example system described herein. In other words, systems for user assistance based on color recognition can perform other functions using other methods in addition to and/or aside from those shown in FIG. 5. Referring to FIGS. 1 through 10, the method 498 shown in the flowchart of FIG. 4 begins at the START step and proceeds to step 461, where an instruction to open an app is received. The instruction can be received by the controller 104 of the user device 155. The instruction can be initiated by the user 150. The instruction can be communicated using the user interface 129 of the user device 155. For example, as shown in FIG. 5, the user interface 129 of the user device 155 (in this example, a smart phone) can be a touch screen, and the instruction to open the app 591 occurs when the user 150 touches the icon for the app 591 on the touch screen. The instruction can be among and/or trigger one or more of the protocols 232 stored in the storage repository 230.

In step 462, the app 591 is presented on the user interface 129 of the user device 155. The app 591 can be presented by the controller 104 using the control engine 206, one or more protocols 232, and/or one or more algorithms 233. The app 591 can be presented in a format that is compatible with the user interface 129. For example, if the user interface 129 is a touchscreen, then the app 591 can be presented across the entire touchscreen with various interactive tools (e.g., virtual pushbuttons, virtual checkboxes, words that link to additional menus).

FIG. 6 shows an example of the home screen of the app 591 presented on the user interface 129 of the user device 155. In this case, the home screen of the app 591 includes a header 645 asking what the user 150 would like to do in the app 591. There are four virtual pushbuttons 641 on the user interface in response to the question in the header 645. Virtual pushbutton 641-1 corresponds to the choice of creating a profile. Virtual pushbutton 641-2 corresponds to the choice of adding clothes to a profile. Virtual pushbutton 641-3 corresponds to the choice of assembling an outfit. Virtual pushbutton 641-4 corresponds to the choice of going shopping for items to add to a wardrobe. In alternative embodiments, the choices can be in some other form (e.g., radio buttons, selections in a drop down menu) other than virtual pushbuttons 641.

Also, rather than a single header 645 in the form of an interrogatory, there can be multiple headers in any of a number of formats (e.g., statements). When virtual pushbutton 641-1 is selected, the process proceeds to step 463. The selection of any of the other virtual pushbuttons 641 in this example could cause the method 498 to proceed to a different step. For example, the selection of virtual pushbutton 641-4 can cause the method 498 to proceed to step 479. The selection of a virtual pushbutton 641 can be made using any suitable implementation device, including but not limited to a finger of the user 150, a voice command, and a stylus.

In step 463, an instruction to capture an image can be received on the app 591. The instruction to capture the image can be received by the controller 104 of the user device 155. The instruction can be initiated by the user 150. The instruction to capture the image can be communicated using the user interface 129 of the user device 155. For example, the user interface 129 of the user device 155 can be a touch screen, and the instruction to capture the image occurs when the user 150 touches an icon, a virtual pushbutton, or some other enablement feature on the touch screen. The instruction can be among and/or trigger one or more of the protocols 232 stored in the storage repository 230.

FIG. 7 shows an example of a screen of the app 591 presented on the user interface 129 of the user device 155 where the screen seeks an instruction to capture an image. In this case, the home screen of the app 591 includes a header 745 asking how the user 150 would like to build a profile. The screen of the app 591 includes three icons 742 that allow a user to instruct what information is used by the app 591 to generate a profile. Icon 742-1 corresponds to the choice of capturing an image using an image capturing device 175.

Icon 742-2 corresponds to the choice of browsing the stored images 231. Icon 742-3 corresponds to the choice of browsing the Internet for external sites 185. In alternative embodiments, the choices can be in some other form (e.g., radio buttons, selections in a drop down menu) other than icons 742.

Also, rather than a single header 745 in the form of an interrogatory, there can be multiple headers in any of a number of formats (e.g., statements). When icon 742-1 is selected, the process proceeds to step 464. The selection of any of the other icons 742 in this example could cause the method 498 to proceed to a different step. For example, the selection of icon 742-2 can cause the method 498 to proceed to step 477. The selection of an icon 742 can be made using any suitable implementation device, including but not limited to a finger of the user 150, a voice command, and a stylus.

In step 464, an instruction to capture an image in the volume of space 199 is sent to an image capturing device 175 of the user device 155. The instruction to capture the image can be sent by the controller 104 to the image capturing device 175 using communication signals 105. The controller 104 can generate the instruction to capture the image using the control engine 206, one or more protocols 232, and/or one or more algorithms 233. If the system 100 has multiple image capturing devices 175, the controller 104 can determine which of the image capturing devices 175 receives the instruction. Such a determination can be based on one or more of a number of factors, including but not limited to user preferences, the type of image used by the app 591, and lighting conditions within the volume of space 199. In some cases, the instruction sent to the image capturing device 175 can include details as to how the image capturing device 175 operates (e.g., lighting requirements, type of image, one or more objects 140 to capture).

Using the example screen of the app 591 presented on the user interface 129 of the user device 155 in FIG. 7, when the icon 742-1 of the camera is selected, interactive controls (e.g., zoom, flash, mode) known in the art for a camera or other image capturing device 175 can be displayed on and/or integrated with the user interface 129. When the user 150 engages these interactive controls on the user interface 129 of the user device 155, instructions to capture an image in the volume of space 199 are sent to an image capturing device 175.

In step 466, an image is received from the image capturing device 175. The image can be or include one or more objects 140. For example, as shown in FIG. 8A, the user interface 129 of the user device 155 can display an image 859-1 received from an image capturing device 175, where the image 859-1 captures part (e.g., the floor) of a closet in a bedroom (an example of a volume of space 199). In this case, the image 859 includes a total of five objects 840. Object 840-1 is in the form of a shirt, object 840-2 is in the form of a coat, object 840-3 is in the form of a pair of earrings, object 840-4 is in the form of a hat, and object 840-5 is in the form of a pair of shoes.

As another example, as shown in FIG. 8B, the user interface 129 of the user device 155 can display an image 859-2 received from an image capturing device 175, where the image 859 captures part (e.g., along a wall) of the closet in the bedroom (still an example of a volume of space 199). In this case, the image 859-2 includes a total of 20 objects 840. Object 840-6 is in the form of a men's sport coat, object 840-7 is in the form of a pair of men's dress slacks, object 840-8 is in the form of a woman's belt, object 840-9 is in the form of a pearl necklace, object 840-10 to object 840-19 are in the form of pairs of men's casual pants, object 840-20 to object 840-25 are in the form of men's pullover shirts, object 840-26 to object 840-29 are in the form of bath towels, and object 840-30 to object 840-35 are in the form of men's bow ties.

As discussed above, each of the images 859 can be a live shot, a still image, a video clip, or any other type of suitable image 859. In some cases, the controller 104 of the user device 155 can control one or more aspects (e.g., focus, zoom, panning) of the image capturing device 175 to capture a usable image 859 for purposes of the app 591. In addition, or in the alternative, the controller 104 of the user device 155 can alter one or more aspects (e.g., cropping, tinting, brightness) of the image 859 after receiving the image 859 from the image capturing device 175. When an image 859 is received, the image 859 can be saved in the storage repository 230 as a stored image 231.

In step 468, each object 140 in the image is identified. Each object 140 can be identified by the analysis module 235 of the controller 104. An object 140 can be identified using the control engine 206, one or more algorithms 233, and/or one or more protocols 232. An object 140 can be identified generically (e.g., an article of clothing), specifically (e.g., a men's short sleeve V-neck T-shirt in size medium), and/or somewhere in between. When an object 140 is identified, each characteristic (e.g., size, gender, material, pattern) that forms the basis of the identification can be stored in one or more tables in the storage repository 230. Similarly, if the stored images 231 are organized in some way by the control engine 206, then one or more of the characteristics of the image 859 can be used to determine where the image 859 is stored within the organization of the stored images 231.

For example, referring to FIG. 8A, the analysis module 235 can categorize object 840-1 as a shirt, a T-shirt, a men's T-shirt, a men's large T-shirt, and/or a men's large cotton T-shirt. As another example, the analysis module 235 can categorize object 840-2 as a coat, a long coat, a rain coat, a woman's long rain coat, and/or a woman's petite long rain coat. As yet another example, the analysis module 235 can categorize object 840-3 as a pair of earrings, a pair of woman's earrings, a pair of woman's pendant earrings, and/or a pair of woman's gold and pearl pendant earrings. As still another example, the analysis module 235 can categorize object 840-4 as a hat, a men's hat, a men's fitted hat, a men's fitted dress hat, a men's fitted size 8 dress hat, and/or a men's fitted size 8 tall dress hat. As yet another example, the analysis module 235 can categorize object 840-5 as a pair of shoes, a pair of athletic shoes, a pair of lace-up athletic shoes, a pair of boys' lace-up athletic shoes, a pair of boys' lace-up leather athletic shoes, and/or a pair of boys' size 9 lace-up leather athletic shoes.

In some cases, an object 140 in an image is identified generically (e.g., a shirt, a shoe) by component (e.g., the network manager 180, an external site 185) aside from the user device 155. Alternatively, the controller 104 of the user device 155 may generically identify an object 140 in an image. In either case, the analysis module 235 of the controller 104 of the user device 155 may be configured to categorize (e.g., gender, size, style, material) each identified object 140. For example, the network manager 180 may identify object 840-6 of image 859-2 as a coat, while the analysis module 235 of the controller 104 may categorize the object 840-6 as a men's sport coat, size 42R, made of 100% wool, in excellent condition (no perceived fraying, stains, or blemishes), and styled from the Disco Era of the late 1970s. In certain example embodiments, the analysis module 235 generates and maintains one or more tables (e.g., as stored data 234) for the various characteristics of each object 140.

There are different ways that the analysis module 235 can characterize an object 140 from an image. For example, if the tag of an article of clothing is captured in the image, the information on the tag (e.g., size, material) can be obtained. In addition, or in the alternative, the controller 104 of the user device 155 can communicate with one or more external sites 185 to obtain and/or confirm characteristic information of an object 140. For example, the controller 104 can find one or more external sites 185 that has the same object (e.g., the same style of men's' sport coat) to obtain and/or confirm that the sport coat is made of 100% wool and is styled from the Disco Era of the late 1970s. In addition, or in the alternative, the app 591 can ask the user 150 for additional details about the object 140 through the user interface 129. In such a case, the additional details can be provided independent of the ability of the user 150 to distinguish colors, have a sense of fashion, and/or other shortcoming of the user 150. Similarly, the app 591 can ask the user 150, through the user interface 129 of the user device 155, to confirm whether categorization information generated by the analysis module 235 is accurate and, if not, to solicit the correct information.

In some cases, depending on the purpose of the app 591 (discussed below), when an image has multiple objects 140, the controller 104 can remove or disregard one or more of the objects 140 that have no applicability. For example, if the purpose of the app 591 is to suggest an outfit, an image of a volume of space 199 can include multiple objects 140 that are in the form of clothing as well as other items (e.g., boxes, bags) that are not applicable in terms of the purpose of the app 591. In some cases, the controller 104 can determine, using the control engine 206, one or more protocols 232, and/or one or more algorithms 233, which objects 140 can be disregarded because they will not be considered for a recommended outfit. As another example, the controller 104 can use the user interface 129 to prompt for the selection of a subset (e.g., one, objects of interest) of the objects 140 captured in the image that are relevant or irrelevant to the purpose of the app 591.

In step 469, each color of each object 140 in the image is identified. Each color of an object 140 can be identified by the color recognition module 236 of the controller 104. A color of an object 140 can be identified using the control engine 206, one or more algorithms 233, and/or one or more protocols 232. A color can be identified generically (e.g., red, blue), specifically (e.g., mango orange, sage green), and/or somewhere in between. If an object 140 has multiple colors, each color can be identified. Further, in such a case, each color can further be categorized (e.g., a predominant color, an accent color, a pattern color) by its role. When a color of an object 140 is identified, each characteristic that forms the basis of the identification can be stored in one or more tables in the storage repository 230.

For example, referring to FIG. 8A, object 840-1 can be identified as having a single color of yellow. Object 840-2 can be identified as having a primary color of pink with small black polka dots and lavender accents. Object 840-3 can be identified as having gold and ivory primary colors with accent colors of red, white, and green. Object 840-4 can be identified as having a primary color of purple with royal blue and black accents. Object 840-5 can be identified as having a primary color of white with accents of navy blue and light gray. In some cases, the color recognition module 236 can distinguish various characteristics of a color, such as whether a color is bright, faded, or muted.

In step 482, one or more profiles of the user 150 is generated using the image of step 468 and colors of step 469. A profile can be generated by the profile module 237 of the controller 104. Each profile defines one or more preferences (e.g., a clothing style preference, a jewelry style preference, an accessory style preference, a color preference, a flower preference, a plant preference, a food preference) of a user. The profile module 237 can generate a profile using the control engine 206, one or more algorithms 233, and/or one or more protocols 232. In addition, profile module 237 can generate a profile using a stored image 231, an external image 187, a live image presented by an image capturing device 175, and/or a page on an external site 185.

For example, the profile module 237 can generate a profile that concludes that the user 150 is a male who wears size large shorts, size extra-large t-shirts, size 11 wide shoes (a mixture of athletic shoes and dress shoes), dress slacks with waist 36 and length 32, long sleeve dress shirts with a 17 inch neck and 34 inch sleeve, size 46 sport coats, and a mixture of leather belts. The profile generated by the profile module 237 can also conclude that the user 150 prefers the colors of black, green, and white in his clothing. The profile generated by the profile module 237 can also conclude that the user 150 tends to buy new clothing having the latest fashion trends for middle aged men on a frequent (at least once a year) basis.

In such a case, the analysis module 235 can seek emerging fashion trends for middle-aged men on external sites 185 and present purchasing options to the user 150 through the user interface 129 when particular options fitting within the profile (e.g., in terms of color, in terms of size) of the user 150 are found. The profile module 237 can generate the profile using one or more images (e.g., stored images 231, a live image provided by an image capturing device 175) where the objects 140 are articles of clothing and where the volume of space 199 is a bedroom closet of the user 150.

In step 471, the colors of objects 140 in the volume of space 199 are analyzed consistent with the profile and the purpose of the app 591. The purpose of the app 591 can be a fixed setting (e.g., the app 591 is specific for identifying mold on food, the app 591 is specific for creating an outfit, the app 591 is specific for selecting jewelry and/or other accessories for a particular outfit), a menu-driven setting (e.g., selectable from a drop down list once the app 591 is opened, selectable from a list of radio button selections once the app 591 is opened), or determined in some other way, whether user-driven or otherwise. The analysis of the colors of the objects 140 can be performed by the analysis module 235 of the controller 104 after the colors have been identified by the color recognition module 236. In some cases, the analysis of the colors of objects 140 in the volume of space 199 is performed using interactions between the analysis module 235 and the profile module 237 to determine if an object and/or its associated color fits within a profile generated by the profile module 237. The analysis of the colors can be performed using the control engine 206, one or more algorithms 233, and/or one or more protocols 232.

One or more objects 840 whose colors are analyzed can be captured in the images 859 discussed above with respect to step 469. In addition, or in the alternative, one or more objects 840 whose colors are analyzed can be captured in one or more stored images 231. In such a case, the stored images 231 can capture objects 140 in the volume of space 199 (e.g., a closet, a drawer, an armoire), objects 140 in another volume of space (e.g., another closet in another room, another drawer) proximate to the volume of space 199, and/or objects 140 in another location (e.g., at a store, on a website, at another house). In addition, or in the alternative, one or more objects 840 whose colors are analyzed can be captured in one or more additional images captured by an image capturing device 175.

If the colors of one or more objects 140 have not yet been identified (e.g., if an object 140 is part of a stored image 231 and its colors have not been identified), then step 469, or portions thereof, can be used in conjunction with this step 471 to identify the colors so that the colors of the object 140 can be analyzed. When the colors of an object 140 are analyzed, the colors can be compared to some reference. For example, if the purpose of the app 591 is to find a shirt and a matching pair of shorts (the objects 140 in step 468), the reference can be the predominant color in the shirt or the pair of shorts. As another example, if the purpose of the app 591 is to determine whether an orange (the object 140 in step 468) has mold, the reference can be one of the stored images 231 showing an orange with mold. As another example, if the purpose of the app 591 is to find a pair of earrings to match a dress (the object 140 in step 468), the reference can be an accent color of the dress.

In step 472, the results of the analysis are presented. The results can be presented by the controller 104 using the control engine 206, one or more protocols 232, and/or one or more algorithms 233. The results can be presented on the user interface 129 of the user device 155 in a format (e.g., shown on a display, audio instructions broadcast using a speaker) that is compatible with the user interface 129. For example, if the user interface 129 is a touchscreen, then the results can be presented as a graphical image across the entire touchscreen with various interactive tools (e.g., each object 140 shown in the results is selectable by touch). The results can be presented visually, audibly, in some other format, or any suitable combination thereof.

FIG. 9 shows an example of a user interface 129 of a user device 155 used to present the results of an analysis. Using the image 859-2 of FIG. 8B, if the purpose of the app 591 is to select an outfit that goes with object 860-6 (the men's sport coat), the results can identify object 840-11, object 840-24, and object 840-34 as the items of clothing that will complete the outfit with the sport coat. The controller 104 can communicate these selected objects 840 in one or more of any of a number of ways, including but not limited to highlighting the objects 840 (e.g., using an outline box or oval, as shown in FIG. 9), inserting arrows on the display, and broadcasting instructions through a speaker (e.g., the bow tie is in the middle of the second row of bow ties).

In step 473, a determination is made as to whether feedback on the results has been received. The feedback can be received by the controller 104 of the user device 155. The feedback can be provided by the user 150. The feedback can take on one or more of any of a number of forms. For example, the feedback can be or include a request to run the analysis again under different parameters (e.g., all objects 140 must be located in the volume of space 199). As another example, the feedback can be or include a request to base the analysis on another object 140 (e.g., another item of clothing). As still another example, the feedback can be or include a request to remove or substitute a recommended object 140.

The feedback can be communicated using the user interface 129 of the user device 155. For example, as shown in FIG. 10, if the user 150 rejects one of the recommended clothing items that is presented on the user interface 129 of the user device 155, a request for additional feedback can be presented on the user interface 129. In this case, the user 150 has communicated, through the user interface 129 on the user device 155, that the shirt (object 840-24 in FIG. 9) that was recommended is not acceptable. As a result, the screen in FIG. 10 is presented to solicit feedback from the user 150 as to why the shirt is not acceptable. In this case, the screen of the app 591 includes a header 1045 asking what the issue is with the shirt that was recommended but rejected by the user 150. There are five virtual pushbuttons 1041 on the user interface 129 in response to the question in the header 1045. Virtual pushbutton 1041-1 corresponds to the choice of the shirt being the wrong size. Virtual pushbutton 1041-2 corresponds to the choice of the shirt having stains. Virtual pushbutton 1041-3 corresponds to the choice of the shirt having holes in it. Virtual pushbutton 1041-4 corresponds to the choice of the shirt fraying at the seams. Virtual pushbutton 1041-5 corresponds to the choice of some other reason. In alternative embodiments, the choices can be in some other form (e.g., radio buttons, selections in a drop down menu) other than virtual pushbuttons 1041.

Also, rather than a single header 1045 in the form of an interrogatory, there can be multiple headers in any of a number of formats (e.g., statements). When virtual pushbutton 1041-1 is selected, there can be submenus that are followed. For example, if the user 150 selects virtual pushbutton 1041-1 in FIG. 10, the user interface 129 can subsequently show a screen asking whether the shirt is too large or too small. As another example, if the user 150 selects virtual pushbutton 1041-2 in FIG. 10, the user interface 129 can subsequently show a screen asking whether the shirt needs to be washed, whether the shirt needs to be drycleaned, or whether the stains in the shirt are permanent.

The feedback can be among and/or trigger one or more of the protocols 232 stored in the storage repository 230. For example, such as what is shown in FIG. 10, if the feedback reveals a problem with an object 840 (e.g., not the right size, needs to be drycleaned), the controller 104 can take steps to correct the problem. As a specific example, if an article of clothing (e.g., a shirt) is not the right size, but is otherwise acceptable (e.g., the right style, the right material, the right color(s)), the controller 104 can communicate with one or more external sites 185 to find the same or a similar object 840 in the correct size. If the object 840 in the correct size is found on an external site 185, then the controller 185 can order and pay for the new object 840 or seek approval before ordering the object 840.

As another specific example, if the object 840 needs to be drycleaned, the controller 104 can arrange to have the object 840 picked up for drycleaning. As still another example, if the object 840 is not of a style or pattern that the user 150 likes, then the controller 104 can present alternative options for the object 840, whether in the volume of space 199, in another volume of space adjacent to the volume of space 199, and/or on an external site 185. When the user 150 selects an alternative, the controller 104 can order the object 840 if the object 840 is found on an external site 185. In addition, the controller 104 (and more specifically, the profile module 237 can modify one or more of the profiles of the user 150 based on the new selection and related information. If feedback on the results has been received, then the process proceeds to step 474. If feedback on the results has not been received, then the process proceeds to step 476.

In step 474, the results are analyzed in light of the feedback received. Analysis of the results in light of the feedback received can be performed by the analysis module 235. Analysis of the results in light of the feedback received can be performed using the control engine 206, one or more protocols 232, and/or one or more algorithms 233. In some cases, the feedback can result in a modification of one or more profiles and/or the generation of one or more new profiles by the profile module 237. As discussed above, analyzing the results can include re-running some or all of the steps of the method 498 discussed above. Once the results are analyzed in light of the feedback received, the process can revert to step 472.

In step 476, a determination is made as to whether instructions have been received to capture another image. The instruction to capture another image can be received by the controller 104 of the user device 155. The instruction can be initiated by the user 150. The instruction to capture another image can be communicated using the user interface 129 of the user device 155. For example, the user interface 129 of the user device 155 can be a touch screen, and the instruction to capture another image occurs when the user 150 touches an icon, a virtual pushbutton, or some other enablement feature on the touch screen within the app 591. The instruction can be among and/or trigger one or more of the protocols 232 stored in the storage repository 230. If instructions have been received to capture another image, the process can revert to step 464. If instructions have not been received to capture another image, the process can proceed to step 477.

In step 477, a determination is made as to whether there are other identified objects 140 from a volume of space (e.g., another room, another closet, a different drawer) that is proximate to the volume of space 199. The other identified objects 140 can be included in the stored images 231 in the storage repository 230. For example, before a previously-taken image is saved in the storage repository 230 as a stored image 231, the image is processed in a manner similar to what is described in step 468 and step 469 above, and one or more profiles are generated and/or revised by the profile module 237 in a manner similar to what is described in step 482 above. In addition to saving the previously-taken image in the stored images 231, the various identifications and characteristics (e.g., color, pattern, size, type, material, location) of each object 140 in each stored image 231 are stored in one or more tables as stored data 234. If the objects 140 in the stored images 231 are accessible (e.g., are located in another room or part of a room) to a user 140, those identified objects 140 can be considered in the analysis. If there are other identified objects 140 from a proximate volume of space, the process proceeds to step 478. If there are no other identified objects 140 from a proximate volume of space, the process proceeds to step 479.

In step 478, the colors of the identified objects 140 from a proximate volume of space are analyzed consistent with the profiles and the purpose of the app 591. The analysis of the colors of the identified objects 140 can be performed by the analysis module 235 of the controller 104. The analysis of the colors can be performed using the control engine 206, one or more algorithms 233, and/or one or more protocols 232. In some cases, the analysis of the colors of objects 140 in the volume of space that is proximate to the volume of space 199 is performed using interactions between the analysis module 235 and the profile module 237 to determine if an object 140 from a proximate volume of space and/or its associated color fits within a profile generated by the profile module 237. If the colors of one or more objects 140 in a stored image 231 have not yet been identified, then step 469, or portions thereof, can be used in conjunction with this step 478 to identify the colors so that the colors of the object 140 in the stored image 231 can be analyzed. When the colors of an object 140 in the stored image 231 are analyzed, the colors can be compared to some reference, as discussed above with respect to step 471. When step 478 is completed, the process can revert to step 472.

In step 479, a determination is made as to whether there are other objects 140 in external images 187 on external sites 185. As discussed above, the external sites 185 can be or include a website and/or other digital repository of information and/or external images 187 that include one or more objects 140. Such objects 140 captured in the external images 187 can potentially be used for the purpose of the app 591. An external site 185 can offer products that can be used as references and/or recommendations for the purpose of the app 591. In some cases, the control engine 206 of the controller 104 can identify particular external sites 185 that have products (e.g., objects 140) and/or information (e.g., articles on the latest fashion trends) that fall within a profile of the user 150, as generated by the profile module 237.

In addition, or in the alternative, one or more profiles of a user 150 can be shared with one or more external sites 185, either by an external site 185 requesting the profiles or by the controller 104 offering the profiles to the external site 185. In such cases, an external site 185 (e.g., a vendor, a manufacturer, a designer) can use one or more of the profiles of one or more users 150 to design, manufacture, and/or sell products (objects 140) that fall within those profiles. These products offered by a vendor of an external site 185 can be mass produced, regionally produced, or specially made. An external site can communicate the price and availability of these objects 140 to the controller 104 for use by the analysis module 235. In some cases, the network manager 180 can be in communication with multiple user devices 155 and store profiles from those user devices 155. In such cases, the network manager 180 can communicate with one or more of the external sites 185 to drive production of certain products (objects 140). An external image 187 of an external site 185 can be copied and saved by the user device 155 as a stored image 231.

As an example, if the analysis module 235 determines that the user 150 needs another men's size medium 100% cotton short-sleeve pullover shirt in seafoam green as a primary or secondary color to fit within a profile generated by the profile module 237, then the controller 104 can search one or more external sites 185 to find such an object 140. When the object 140 is found, the analysis module 235 and the profile module 237 can communicate with each other to confirm that the object 140 falls within a profile. In some cases, controller 104 may be operating on a budget (e.g., approved by the user 150), in which case the controller 104 may purchase the object 140 without seeking prior approval from the user 150 to do so. In other cases, such as when there is no pre-approved budget or if the user 150 expressly requires prior approval by the user 150 before a new object 140 is ordered, the controller 104 can seek approval from the user 150 before purchasing the object 140. If there are other objects 140 in external images 187 on external sites 185, the process can proceed to step 481. If there are no other objects 140 in external images 187 on external sites 185, the process can proceed to the END step.

In step 481, the colors of the other objects 140 in external images 187 on external sites 185 are analyzed consistent with the profiles and the purpose of the app 591. The analysis of the colors of the other objects 140 in external images 187 on external sites 185 can be performed by the analysis module 235 of the controller 104. The analysis of the colors can be performed using the control engine 206, one or more algorithms 233, and/or one or more protocols 232. In some cases, the analysis of the colors of objects 140 in the external images 187 is performed using interactions between the analysis module 235 and the profile module 237 to determine if an object 140 in an external image 187 on an external site 185 and/or its associated color fits within a profile generated by the profile module 237. If the colors of an object 140 in an external image 187 on an external site 185 have not yet been identified, then step 469, or portions thereof, can be used in conjunction with this step 481 to identify the colors so that the colors of the object 140 in an external image 187 on an external site 185 can be analyzed. When the colors of an object 140 in an external image 187 on an external site 185 are analyzed, the colors can be compared to some reference, as discussed above with respect to step 471. When step 481 is completed, the process can revert to step 472.

As another example, after a profile is generated and saved by the profile module 237, the control engine 206 of the controller 104 can present a screen on the user interface 129 of the user device 155 to initiate a transaction for an object 140 on an external site 185 that fits within the profile. When the transaction for the object 140 is initiated by the user 150 through the user interface 129, a shopping cart can be initialized, and the controller 104 can transmit the profile to the external site 185 (e.g., a clothing vendor API). The external site 185 can return deals and discounts to the controller 104, and the controller 104 can present these deals and discounts to the user 150 on the user interface 129 as part of the transaction. The user 150 may decide, through the user interface 129, to continue the transaction by adding items to the cart or to cancel the transaction.

In such an example, the cart displayed on the user interface 129 can be vendor agnostic. In other words, the cart may contain items from multiple vendors (e.g., vendor A, vendor B, vendor C, vendor D), where each vendor has its own unique external site 185. When a transaction is completed by the user 150 on the user interface 129, sub-transactions of the transaction can be generated by the controller 104 for each vendor with relevant payment information included. A transaction receipt can be generated by the controller 104 for record keeping. All transactions and related sub-transaction can be saved in a database (stored data 234) by the control engine 206 of the controller 104 based on configurable retention periods, vendors, categories of objects 140, and/or other factors.

Example embodiments can be used to provide user assistance based on color recognition. Example embodiments can be used to assist a user who is legally blind or color blind. Example embodiments can be used to assist a user who lacks knowledge of subjects such as fashion trends and food health. Example embodiments can be used with respect to any type of object in any location, whether physical or virtual. Example embodiments can save time and resources.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A user device, comprising:
a controller configured to:
receive, from a user with a color blindness, an instruction associated with a color of an object in a volume of space, wherein the color is not recognized to the user due to the color blindness;
receive, from an image capturing device, an image comprising the object;
identify a color of the object captured in the image;
generate, using a profile module, a profile based on the object and the color, wherein the profile is specifically designed for the user with the color blindness, and wherein the color of the object is not fundamentally changed by the profile module for the profile;
perform an analysis of the color in a manner consistent with the profile of the user with the color blindness and the instruction; and
present, via a user interface, results of the analysis; and
the image capturing device configured to capture the image in a volume of space, wherein the image capturing device is communicably coupled to the controller, wherein the controller is further configured to instruct the image capturing device to capture the image in the volume of space, and wherein the controller is further configured to receive the image from the image capturing device.

2. The user device of claim 1, wherein the controller comprises a color recognition module that is configured to identify the color of the object.

3. The user device of claim 1, wherein the controller comprises an analysis module that is configured to perform the analysis.

4. The user device of claim 1, wherein the controller comprises a communication module that is configured to communicate with a network manager, wherein the network manager assists with performing the analysis.

5. The user device of claim 1, wherein the controller comprises a communication module that is configured to communicate with an external site, wherein the communication module receives information from the external site, and wherein the controller uses the information to perform the analysis.

6. The user device of claim 1, wherein the controller comprises a communication module that is configured to communicate with an external site, wherein the communication module receives an external image from the external site, and wherein the external image is used by the controller to perform the analysis.

7. The user device of claim 1, further comprising:
a user interface configured to present an app and receive the instruction.

8. A method for user assistance based on color recognition, the method comprising:
receiving, by a controller of a user device via a user interface from a user with a color blindness, an instruction associated with a color of an object in a volume of space, wherein the color is not recognized to the user due to the color blindness;
receiving, by the controller, an image of the object from an image capturing device;
identifying, by the controller, the color of the object captured in the image;
generating, by the controller, a profile based on the object and the color, wherein the profile is specifically designed for the user with the color blindness, and wherein the color of the object is not fundamentally changed by the profile module for the profile;
performing an analysis, by the controller, of the color in a manner consistent with the profile of the user with the color blindness and the instruction;
presenting, by the controller using the user interface, results of the analysis;
receiving feedback on the results via the user interface;
performing a subsequent analysis of the results in light of the feedback; and
presenting revised results of subsequent analysis.

9. The method of claim 8, wherein the instruction comprises matching the object with an article of clothing.

10. The method of claim 9, wherein the article of clothing is in the volume of space.

11. The method of claim 9, wherein the article of clothing is located in an adjacent volume of space previously analyzed by the controller.

12. The method of claim 9, wherein the article of clothing is located on an external site.

13. The method of claim 12, further comprising:
receiving a subsequent instruction to purchase the article of clothing on the external site.

14. The method of claim 8, wherein the instruction comprises detecting mold on the object.

15. The method of claim 14, wherein the analysis comprises determining whether mold is on the object.

16. The method of claim 8, further comprising:
receiving a command to capture the image in the volume of space; and
instructing the image capturing device to capture the image, wherein the image includes the object.

17. The method of claim 8, wherein the user interface allows for interaction with a software application.

18. The method of claim 8, wherein performing the analysis comprises:
identifying an additional color of an additional object in an external image from an external site; and
comparing the additional color of the additional object with the color of the object.

19. The method of claim 8, wherein the profile is adjusted based on user input.

20. A method for user assistance based on color recognition, the method comprising:
receiving, by a controller of a user device via a user interface from a user with a color blindness, an instruction associated with a color of an object in a volume of space, wherein the color is not recognized to the user due to the color blindness;
receiving, by the controller, an image of the object from an image capturing device;
identifying, by the controller, the color of the object captured in the image;
generating, by the controller, a profile based on the object and the color, wherein the profile is specifically designed for the user with the color blindness, and wherein the color of the object is not fundamentally changed by the profile module for the profile;
performing an analysis, by the controller, of the color in a manner consistent with the profile of the user with the color blindness and the instruction; and
presenting, by the controller using the user interface, results of the analysis;
identifying an additional color of an additional object in an external image from an external site; and comparing the additional color of the additional object with the color of the object.

* * * * *